(12) United States Patent
Tagato

(10) Patent No.: US 7,274,286 B2
(45) Date of Patent: Sep. 25, 2007

(54) ID ISSUE MANAGEMENT SYSTEM, ARTICLE INFORMATION MANAGEMENT SYSTEM AND ID ISSUE MANAGEMENT METHOD

(75) Inventor: Hiroki Tagato, Tokyo (JP)

(73) Assignee: NEC Corporation, Tokyo (JP)

( * ) Notice: Subject to any disclaimer, the term of this patent is extended or adjusted under 35 U.S.C. 154(b) by 202 days.

(21) Appl. No.: 11/106,617

(22) Filed: Apr. 15, 2005

(65) Prior Publication Data

US 2005/0231370 A1 Oct. 20, 2005

(30) Foreign Application Priority Data

Apr. 16, 2004 (JP) ............................. 2004-121461

(51) Int. Cl.
*H04Q 5/22* (2006.01)
(52) U.S. Cl. .................. 340/10.52; 340/572.1; 340/10.51; 235/375
(58) Field of Classification Search .. 340/572.1–572.9, 340/825.22, 825.52, 10.51, 10.52; 235/375–376, 235/385; 700/227
See application file for complete search history.

(56) References Cited

U.S. PATENT DOCUMENTS

2002/0004767 A1* 1/2002 Okamoto et al. ............. 705/28
2002/0007325 A1* 1/2002 Tomon ......................... 705/28
2005/0140502 A1* 6/2005 Ashizawa ................. 340/10.52

FOREIGN PATENT DOCUMENTS

| JP | 07-025407 | 1/1995 |
| JP | 2001-287814 | 10/2001 |
| JP | 2002-037414 | 2/2002 |
| JP | 2002-150241 | 5/2002 |
| JP | 2003-272057 | 9/2003 |

* cited by examiner

*Primary Examiner*—Jeffery Hofsass
*Assistant Examiner*—Hoi C. Lau
(74) *Attorney, Agent, or Firm*—Foley & Lardner LLP

(57) ABSTRACT

An ID issue management system capable of uniquely assigning and issuing an ID depending upon an article classification to a tag having an blank ID, and an article information management system and an ID issue management method capable of managing article information by issuing new IDs are provided. An ID reading and writing control server is connected to an ID issue management server via a network. An operator inputs an article classification by using an input device in the ID reading and writing control server, and places an article which becomes a subject of ID issue on an RF tag reader/writer. If it is detected that an ID is not yet issued, a new ID is received from the ID issue management server and is written. The article classification may also be specified by reading a bar code or on the basis of appearance of the article. Verification is conducted on the written ID to determine whether there is a mistake in writing.

12 Claims, 18 Drawing Sheets

(BLANK RF TAG DETECTION PROCESSING IN ID READING AND WRITING CONTROL SERVER)

FIG. 7 (PROCESSING IN RF TAG READER WRITER)

(NEW ID ISSUE PROCESSING IN ID READING AND WRITING CONTROL SERVER)

(PROCESSING SUBSEQUENT TO ID WRITING IN ID READING AND WRITING CONTROL SERVER)

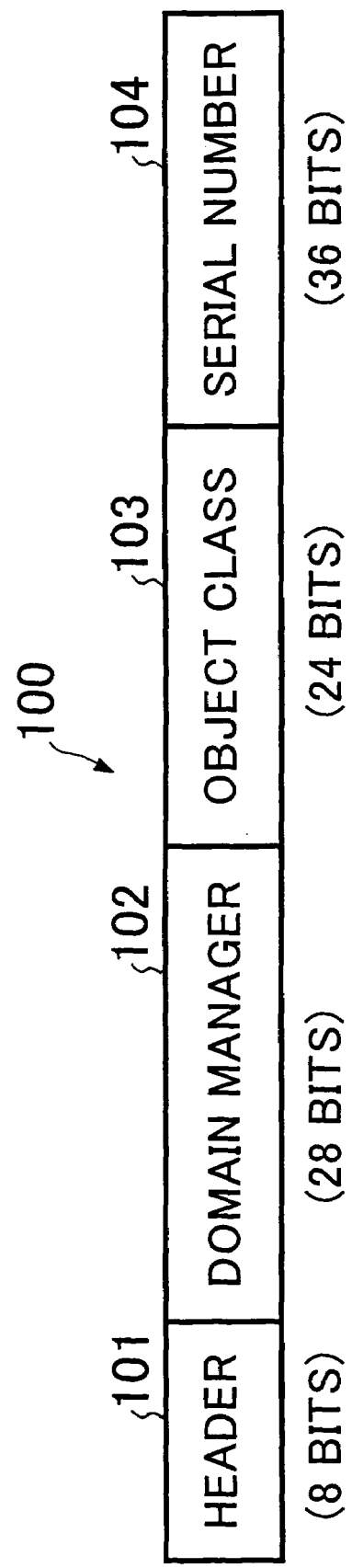

ID ISSUE MANAGEMENT SYSTEM, ARTICLE INFORMATION MANAGEMENT SYSTEM AND ID ISSUE MANAGEMENT METHOD

BACKGROUND OF THE INVENTION

The present invention relates to an ID issue management system which issues an ID serving as identification information to an article such as a commodity, an article information management system which conducts management on article information by using IDs, and an ID issue management method.

Each of commodities sold at stores and articles such as books provided to be perused at libraries is often provided with an ID (Identification) to distinguish it from other articles. Recently, RFID (Radio Frequency Identification) tags (hereafter abbreviated to RF tags) using wireless communication techniques are rapidly spreading. The RF tags are called IC (Integrated Circuit) tags, wireless tags, or electronic tags as well, and each of the RF tags includes an IC chip and an antenna. If this RF tag is attached to or embedded in an article, an ID concerning the article can be transmitted toward an RFID reader or an RFID reader/writer (hereafter simply abbreviated to RFID reader) over radio waves.

Therefore, it is possible for an RFID reader or an application software using an RFID reader to uniquely identify an article having an RF tag attached thereto by the ID. If data concerning articles associated with respective IDs are registered in a predetermined place, therefore, data concerning pertinent articles can be searched and retrieved by using these IDs as key information. As a result, management of articles is facilitated. For example, a system which implements management on movement of goods in a warehouse and shipment by issuing tags based on the information on receipt slips has been proposed (see, for example, Japanese Patent Application Laid-Open No. 2001-287814 (paragraph No. 0009 and FIG. 1)).

In this proposed system, RF tags are only used within the warehouse and does not go through supply chain. Therefore, it is sufficient to keep the uniqueness of IDs within the range of a single warehouse not through the overall supply chain. However, articles such as commodities going through supply chains are handled by multiple parties such as product manufacturers, distribution centers, and retail stores. A system of IDs used in one closed region such as the warehouse cannot be used as it is.

As for standards of IDs used on RF tags, for example, the EPC (Electronic Product Code) prescribed by the EPC global serving as a nonprofit organization is proposed. The EPC has a data structure of 96 bit length.

FIG. 18 shows a data structure of the EPC. An EPC 100 includes an 8-bit header 101, a 28-bit domain manager 102, a 24-bit object class 103, and a 36-bit serial number 104. Among them, the header 101 represents a version of the EPC 100 itself. The domain manager 102 indicates the unit of management of the object class 103 and the serial number 104. The domain manager 102 is typically assigned to each enterprise. The object class 103 indicates the unit of management of the serial number 104. The object class 103 is typically assigned to each classification of products (articles). The serial number 104 is an individual identification number of a pertinent product in a pertinent enterprise.

In order to conduct identification and information management on articles by using RF tags, it is necessary to attach these RF tags in manufacturing processes of respective articles. At this time, it is proposed as one technique to store RF tags with pre-assigned IDs, suitably select RF tags associated with respective articles, and attach the RF tags to the articles. If this technique is adopted, however, it is necessary to store and attach RF tags very carefully so as to properly ensure associations of RF tags with articles to which the RF tags are to be attached. Therefore, it is difficult to sufficiently reduce the cost required to store and attach RF tags.

Therefore, it is proposed to prepare blank RF tags to which IDs are not yet written and write IDs to RF tags after those are attached to articles. According to this proposal, however, issuing an ID is not started until it is detected that an RF tag attached to an article is a blank RF tag. As for IDs stored in RF tags, it is ensured that no two or more same IDs are present by classifying every article with the object class 103 and combining the object class with the unique serial number 104 as evident from the standards shown in FIG. 18.

If IDs are issued in advance for respective article classifications and they are assigned to respective associated articles, there is no possibility that a duplicate ID will be issued. When issuing and writing an ID into an RF tag having a blank ID, however, issuer of the IDs must avoid issuing the same IDs as previously issued ones and issuing IDs whose object class are different from the article classification to which the RF tag is attached.

SUMMARY OF THE INVENTION

Therefore, an object of the present invention is to provide an ID issue management system capable of uniquely assigning and issuing an ID according to an article classification to a blank tag, and an article information management system and an ID issue management method.

According to a first aspect of the present invention, there is provided an ID issue management system including article classification setting means which set an article classification serving as unit of handling, for a subject article, ID issue means which select one unused number from among numbers assigned in advance to the article classification set by the article classification setting means, and issue a new ID having a combination of the selected number with the article classification, tag discrimination means which determine every subject article of ID issue whether a tag having an already issued ID stored therein is attached or a tag having a blank ID is attached, and ID writing means which write an ID issued by the ID issue means into a tag when the tag is judged by the tag discrimination means to have a blank ID.

The ID issue management system may further include ID comparison means which read out an ID written by the ID writing means, and compares the ID with an ID issued by the ID issue means to an article to which a tag storing the ID read out is attached, verification means which verify whether ID coincidence is detected in the ID comparison means, and lock means which lock the ID written by the ID writing means so as not to be rewritten illegally, when the verification means detect ID coincidence and verify that the ID is written correctly.

In the ID issue management system, the article classification setting means may include a bar code reader which reads a bar code attached to an article, and article classification discrimination means which discriminate an article classification on the basis of bar code information read by the bar code reader, an article classification being set on the basis of a result of discrimination conducted by the article classification discrimination means.

In the ID issue management system, the article classification setting means may include image scan means which scans an image of appearance of an article, and article classification discrimination means which discriminate an article classification on the basis of image data obtained by the image scan means, an article classification being set on the basis of a result of discrimination conducted by the article classification discrimination means.

According to a second aspect of the present invention, there is provided an article information management system including the ID issue management system according to the first aspect of the invention, and a management server which registers information of an article to which a tag having an ID stored therein is attached, in association with the ID, when the ID issue means have issued the ID, and manages information of the article.

According to a third aspect of the present invention, there is provided an ID issue management method including an article classification setting step of setting an article classification serving as unit of handling, for a subject article, an ID issue step of selecting one unused number from among numbers assigned in advance to the article classification set at the article classification setting step, and issuing a new ID having a combination of the selected number with the article classification, a tag discrimination step of determining every subject article of ID issue whether a tag having an already issued ID stored therein is attached or a tag having a blank ID is attached, and an ID writing step of writing an ID issued at the ID issue step into a tag when the tag is judged at the tag discrimination step to have a blank ID.

The ID issue management method may further include an ID comparison step of reading out an ID written at the ID writing step, and comparing the ID with an ID issued at the ID issue step to an article to which a tag storing the ID read out is attached, a verification step of verifying whether ID coincidence is detected at the ID comparison step, and a lock step of locking the ID written at the ID writing step so as not to be rewritten illegally, when ID coincidence is detected and it is verified that the ID is written correctly at the verification step.

According to the present invention, it is not necessary to issue IDs in advance associated with respective article classifications as heretofore described. Therefore, it is possible to eliminate troublesome work of preserving already issued IDs and RF tags each having an ID recorded therein and taking out and using a RF tag according to a classification of an article. Furthermore, it is possible to register information of an article in association with an ID without causing a large time lag from issue of the ID. Therefore, it is possible to rapidly and certainly register information (such as the manufacture lot number and time of manufacture) to be associated with respective individual articles and bring the information into a state in which the information can be referred to.

BRIEF DESCRIPTION OF THE DRAWINGS

FIG. 18 is a diagram showing a data structure of the EPC.

DESCRIPTION OF THE PREFERRED EMBODIMENTS

Hereafter, the present invention will be described in detail with reference to embodiments.

Figure 1:
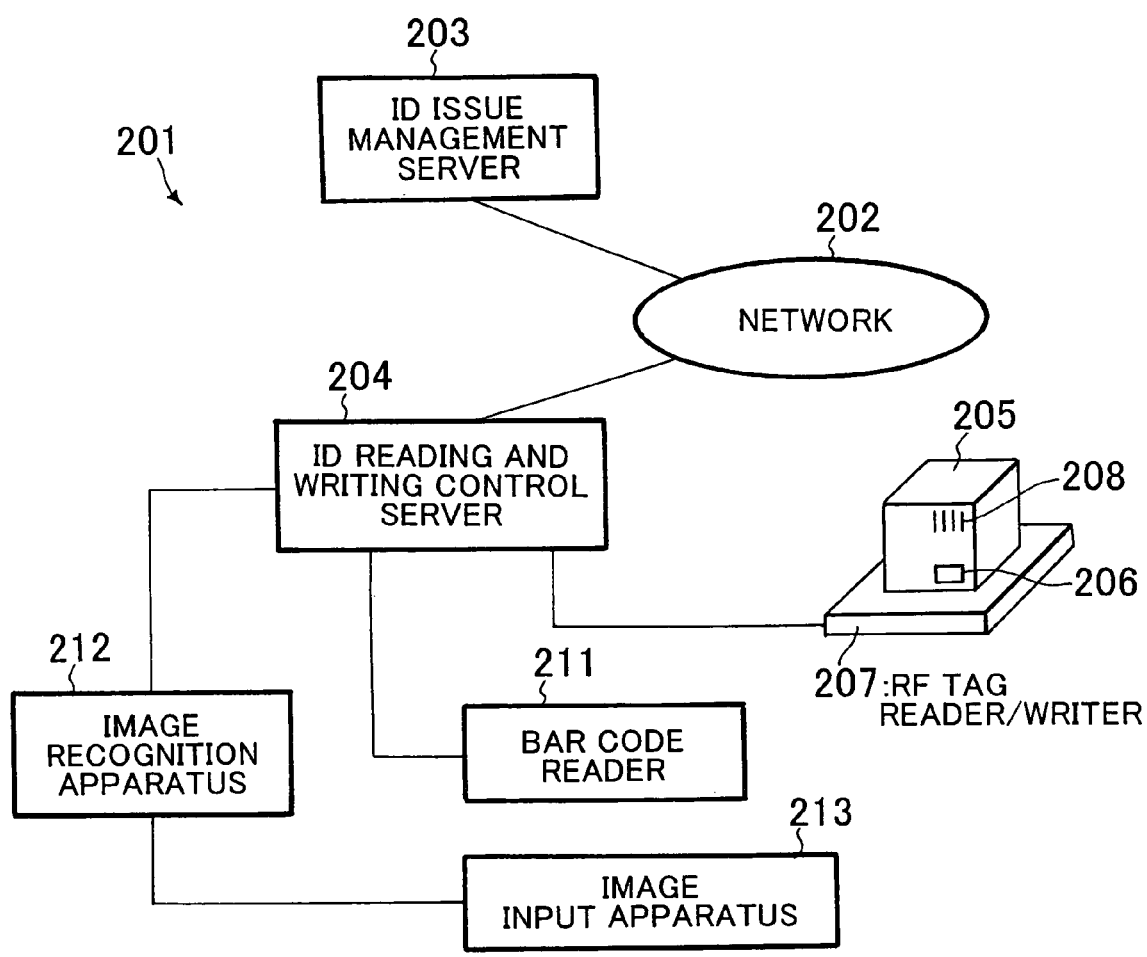
FIG. 1 is a system configuration diagram of an article information management system which conducts issue and management of IDs in an embodiment.

FIG. 1 shows an outline of a configuration of an article information management system which conducts issue and management of IDs in an embodiment of the present invention. An article information management system 201 includes a network 202 such as the Internet, an ID issue management server 203 connected to the network 202 to issue and manage IDs, and an ID reading and writing control server 204 which controls to read and write IDs provided for articles. The ID reading and writing control server 204 is connected to an RF tag reader writer 207 which conducts reading and writing on an RF tag 206 attached to an article 205 which is the subject of RF tag attachment.

The RF tag 206 is formed by attaching an antenna for wireless communication to an IC chip including a memory and the like, which are not illustrated. The RF tag 206 can conduct wireless communication with the RF tag reader/writer 207, and write information into the memory and read written information. One example of information to be written is an ID.

Apparatuses are additionally connected to the ID reading and writing control server 204 to recognize an article 205 having an RF tag 206 into which writing is to be conducted.

In an embodiment, a bar code reader 211, which reads a bar code 208 if the bar code 208 is attached to the article 205, and an image recognition apparatus 212, which conducts image recognition on the article 205, are connected to the ID reading and writing control server 204. An image input apparatus 213 such as a video camera which inputs an image such as appearance of the article 205 is connected to the image recognition apparatus 212. Besides the bar code reader 211 or instead of the bar code reader 211, a reader which reads a two-dimensional code such as a QR code may be connected to the ID reading and writing control server 204 to read code information of articles in the same way.

Figure 2:
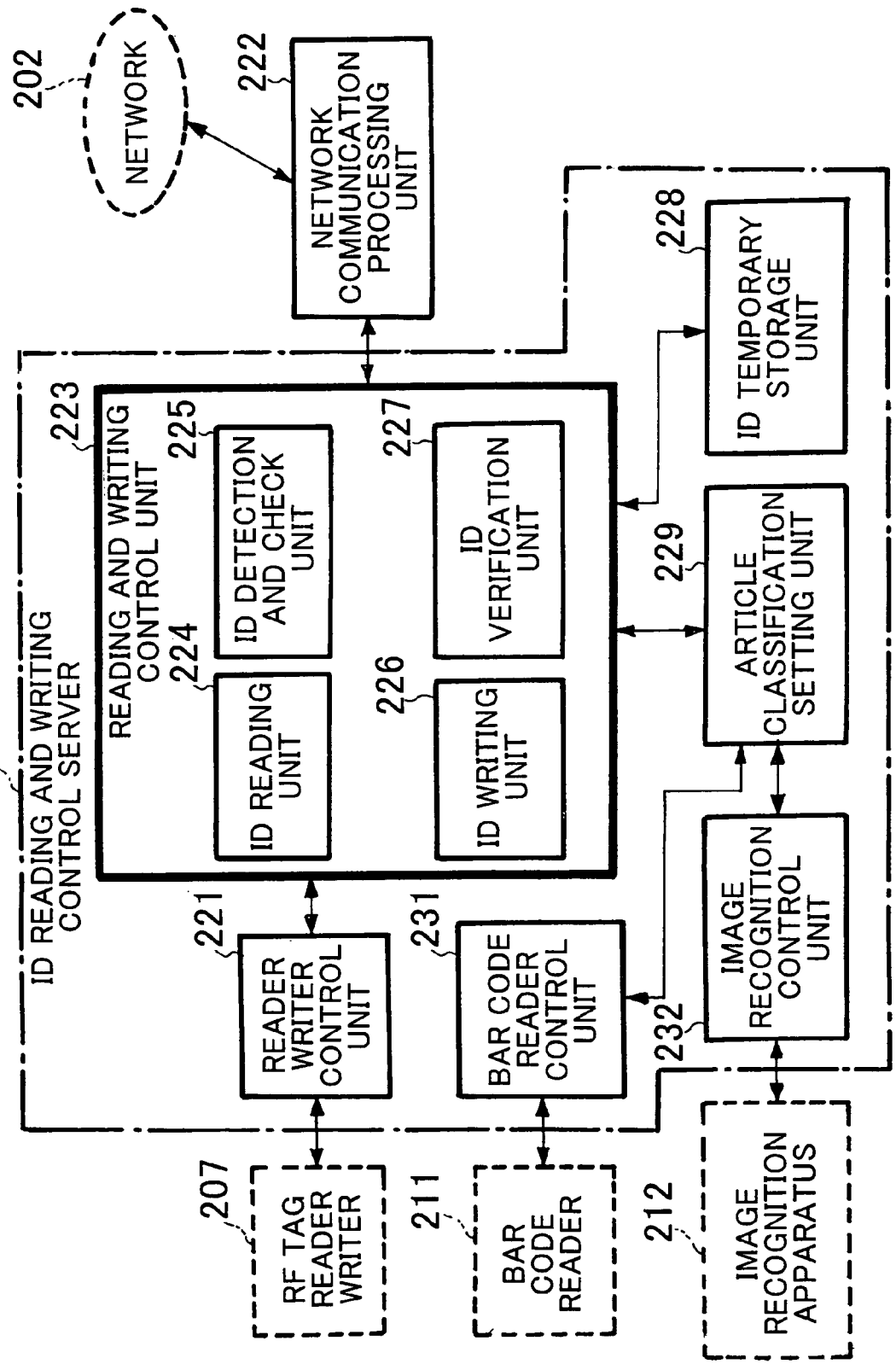
FIG. 2 is a block diagram showing a configuration of an ID reading and writing control server in the embodiment.

FIG. 2 shows a configuration of the ID reading and writing control server 204. The ID reading and writing control server 204 is connected to the RF tag reader/writer 207. The ID reading and writing control server 204 includes a reader/writer control unit 221 connected to the RF tag reader/writer 207 to control it, and a network communication processing unit 222 connected to the network 202 to conduct communication processing. A reading and writing control unit 223 which controls reading and writing of the RF tag 206 (FIG. 1) is disposed between the reader/writer control unit 221 and the network communication processing unit 222. The reading and writing control unit 223 includes an ID reading unit 224 which requests ID reading, an ID detection and check unit 225 which checks whether an ID is already written into an RF tag 206 (FIG. 1), an ID writing unit 226 which requests ID writing, and an ID verification unit 227 which verifies whether an ID requested to be written is written into the RF tag 206 correctly.

The reading and writing control unit 223 is connected to an ID temporary storage unit 228 which temporarily retains an ID sent from the ID issue management server 203, and an article classification setting unit 229 which sets an article classification of an article 205 provided with an RF tag 206, as well. In the case of the present embodiment in which the article information management system 201 is constructed as a system including the bar code reader 211 and the image recognition apparatus 212, the article classification setting unit 229 is connected to a bar code reader control unit 231 and an image recognition control unit 232, which discriminate a commodity classification as the classification of the article 205. The article classification will be described in detail later.

It is now supposed that an article is provided with only a bar code as identification information at a stage of shipment from a factory. When a market has decided to use RF tags, it becomes necessary to add an RF tag to the article in association with the bar code. In such a case, the bar code reader 211 is used. The bar code reader 211 is used when, for example, importing and selling a commodity which was manufactured in a foreign country and which was not provided with an RF tag in the manufacturing country. The image recognition control unit 232 is used to add an RF tag when, for example, repairing or inspecting a used commodity or the like having no bar code and then newly sending the resultant commodity to the market.

The ID reading and writing control server 204 shown in FIG. 2 includes a CPU which is not illustrated, and a storage medium which can store various data such as a control program executed by the CPU, in the same way as personal computers. The CPU executes a control program stored in a storage medium which is not illustrated. As a result, many of the above-described circuit portions are implemented functionally by software.

Figure 3:
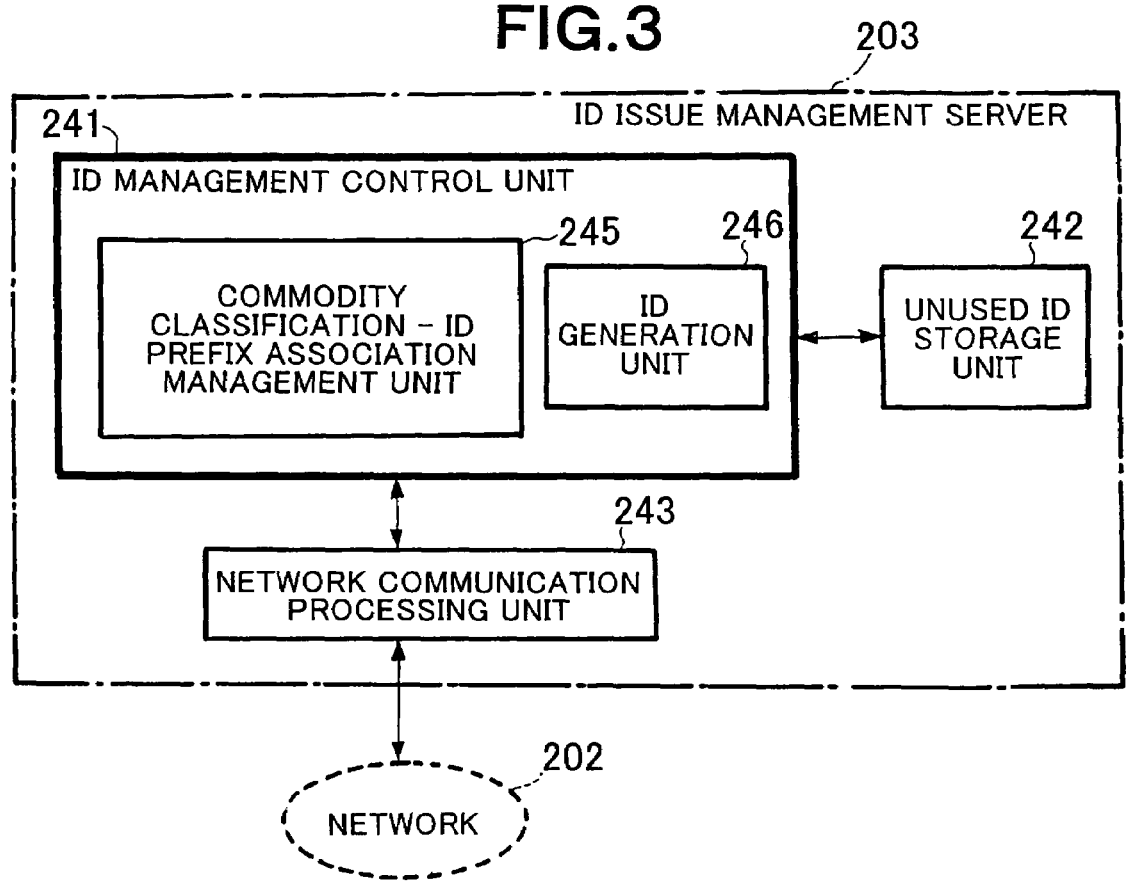
FIG. 3 is a block diagram showing a configuration of an ID issue management server in the embodiment.

FIG. 3 shows a configuration of the ID issue management server 203. The ID issue management server 203 includes an ID management control unit 241 which manages IDs, an unused ID storage unit 242 which stores unused serial numbers to use them as IDs, and a network communication processing unit 243 connected to the ID management control unit 241 to conduct communication processing with the network 202. The ID management control unit 241 includes a commodity classification-ID prefix association management unit 245 which manages an association between a commodity classification sent from the ID reading and writing control server 204 and a prefix which becomes a part of a newly generated ID number, and an ID generation unit 246 which generates a new ID. The ID generation unit 246 selects one of unused serial numbers held in the unused ID storage unit 242, and combines it with a prefix to generate a new ID.

Here, the commodity classification refers to a unit of commodity handling at the time of performing various business steps such as storage, transportation, inspection, exhibition, and sale. For example, considering distribution of CPG (Consumer Packaged Goods), the unit of transportation (handling), such as an article, a case, a pallet and a container corresponds to a commodity classification. Even if brands of products are the same, therefore, the products are regarded as belonging to different commodity classifications if the transportation units are different. For example, even if a refreshing drink which is a contained liquid is completely the same, the case where the containers containing the refreshing drink are 350-ml cans and twenty-four cans are contained in one corrugated cardboard box is different in commodity classification from the case where the containers containing the refreshing drink are 500-ml cans and twelve cans are contained in one corrugated cardboard box. The case where the same refreshing drink is contained in 1.5-l pet bottles and six pet bottles are contained in one corrugated cardboard box is also different in classification from the corrugated cardboard box containing cans. In the case of this example, an RF tag is attached to the case such as the corrugated cardboard box, and consequently it becomes one unit in commodity classification.

In some cases, commodity classifications assume a hierarchical structure. For example, if an RF tag is attached to each muskmelon and two or four muskmelons are contained in a corrugated cardboard box and distributed, each muskmelon serving as an individual article and the muskmelons contained in the corrugated cardboard box are in a hierarchical relation and each of them becomes one unit in commodity classification. Therefore, it can be that the commodity classification is the unit of management of commodities using an RF tag. The article classification is a concept obtained by replacing commodities with articles.

In the same way as personal computers, the ID issue management server 203 shown in FIG. 3 also includes a CPU which is not illustrated and a storage medium which can store various data such as a control program. And the CPU implements many of the above-described circuit portions functionally by executing the control program stored in the storage medium.

Figure 4:
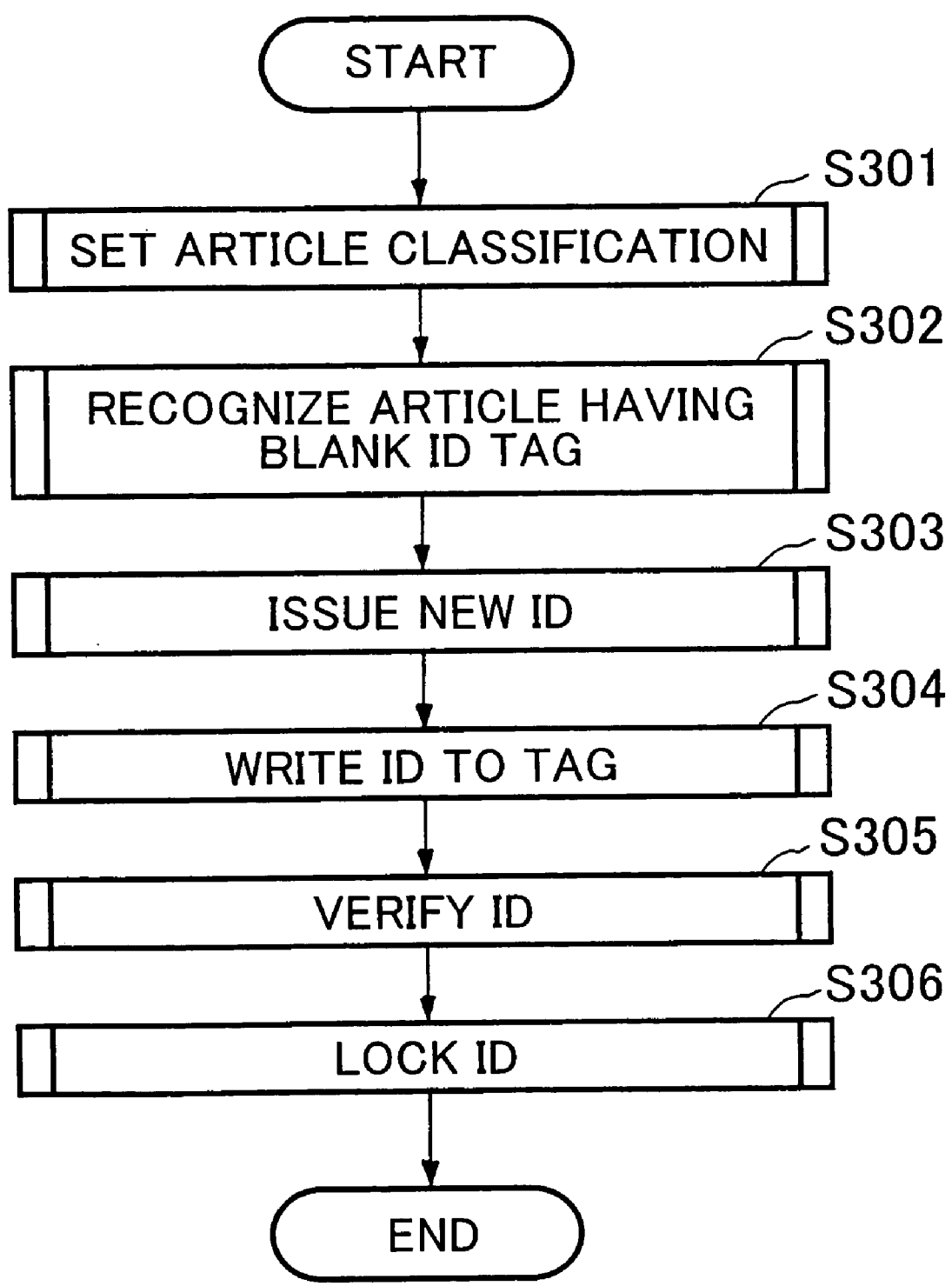
FIG. 4 is a flow chart showing an outline of ID writing processing in the embodiment.

FIG. 4 shows an outline of a flow of processing of issuing an ID as identification information to an article in the article information management system having the configuration heretofore described. In the present embodiment, a subject article classification is first set when providing the RF tag 206 of the article 205 with an ID (step S301). This aims at first specifying an article classification of an article 205 and writing an ID associated with the article classification into an RF tag 206. Whereas the commodity classification is intended for a commodity, a classification intended for an article is used as an article classification herein.

The article classifications may be specified by an operator who ascertains the subject articles 205 one after another. Alternatively, the article classification may be automatically specified based on information obtained from each article 205. In the present embodiment, the bar code reader 211 is connected to the ID reading and writing control server 204. If an article 205 having an RF tag 206 onto which an ID is to be written has a bar code 208, therefore, the article classification can be specified by reading the code information.

For example, it is now supposed that predetermined information such as the date of manufacture is printed on a surface of a box collectively together with the bar code when packing respective articles serving as individual articles. In such a case, it is possible to read the bar code by using the bar code reader 211 and specify the article classification thereby. It is now supposed that the corrugated cardboard box containing a plurality of muskmelons described earlier has a bar code printed in the manufacturing country. When packing each of the muskmelons in a box at the stage of distribution and attaching an RF tag to the box, the bar code described on the corrugated cardboard box is read by the bar code reader 211 and the article classification of each muskmelon regarded as an individual article having a commodity classification which is lower in hierarchy by one level is specified.

As for an article having no bar code 208 attached thereto, image data of appearance of an article 205 having an RF tag 206 onto which an ID is to be written is taken in the image recognition apparatus 212 by using the image input apparatus 213 such as a video camera. And the article classification of the article 205 is discriminated by referring to a database which is not illustrated and which stores appearances of various articles as image data. Image data retrieved in the database need not be the entire appearance, but may be a principal part. For example, if a symbol indicating an article classification is described in a part of the appearance of a product regarded as an article by marking or the like, it is also possible to ascertain the article classification by inputting such a symbol as image data and conducting character recognition.

In the present embodiment, articles 205 to be subject to ID writing 20 (including articles contained in a package such as a corrugated cardboard box) are placed in order one by one on the RF tag reader writer 207 by, for example, the operator and processing of writing into the RF tags 206 is conducted. The ID issue management server 203 requests the RF tag reader writer 207 to read IDs at predetermined time intervals which are sufficiently shorter than time intervals at which these articles 205 are placed one by one.

In response to this ID reading request, the RF tag 206 reads out the ID from the memory in an IC chip of itself and sends the ID by using a radio wave. In the present embodiment, however, ID issue processing is conducted. Therefore, RF tags each having an ID already stored in the IC chip are not intended for. Accordingly, recognition conducted by the RF tag reader/writer is intended for only articles each having an RF tag 206 that returns a blank ID serving as an ID in the unregistered state in response to the ID reading request. In other words, upon recognizing an article to which an RF tag having a blank ID (hereafter referred to as blank RF tag) is attached (step S302), a new ID concerning the article is issued (step S303). If there is an RF tag 206 that returns all "0"s as the ID, it is discriminated as a blank RF tag in the present embodiment. However, if there is an RF tag that returns a special response indicating the blank state when the ID is blank, in response to an ID reading request, the RF tag may be judged to be a blank RF tag upon receiving the special response.

A new ID is generated by acquiring an ID prefix associated with the article classification specified at the step S301, retrieving and selecting one of serial numbers that are not used in the acquired prefix, and combining the prefix with the serial number. The ID reading and writing control server 204 temporarily stores the generated new ID, and then causes the RF tag reader/writer 207 to write the new ID into the RF tag 206 of a pertinent commodity (step S304). Subsequently, the ID reading and writing control server 204 causes the RF tag reader/writer 207 to read an ID from the RF tag 206 of the same article, and verifies whether the ID read out coincides with the ID ordered to be written (step S305). If it is thus ascertained that the ID is correctly written into the RF tag of the pertinent article 205, the ID reading and writing control server 204 causes the RF tag reader/writer 207 to lock the ID (step S306). As heretofore described, writing an ID into the article 205 is finished (end).

Figure 5:
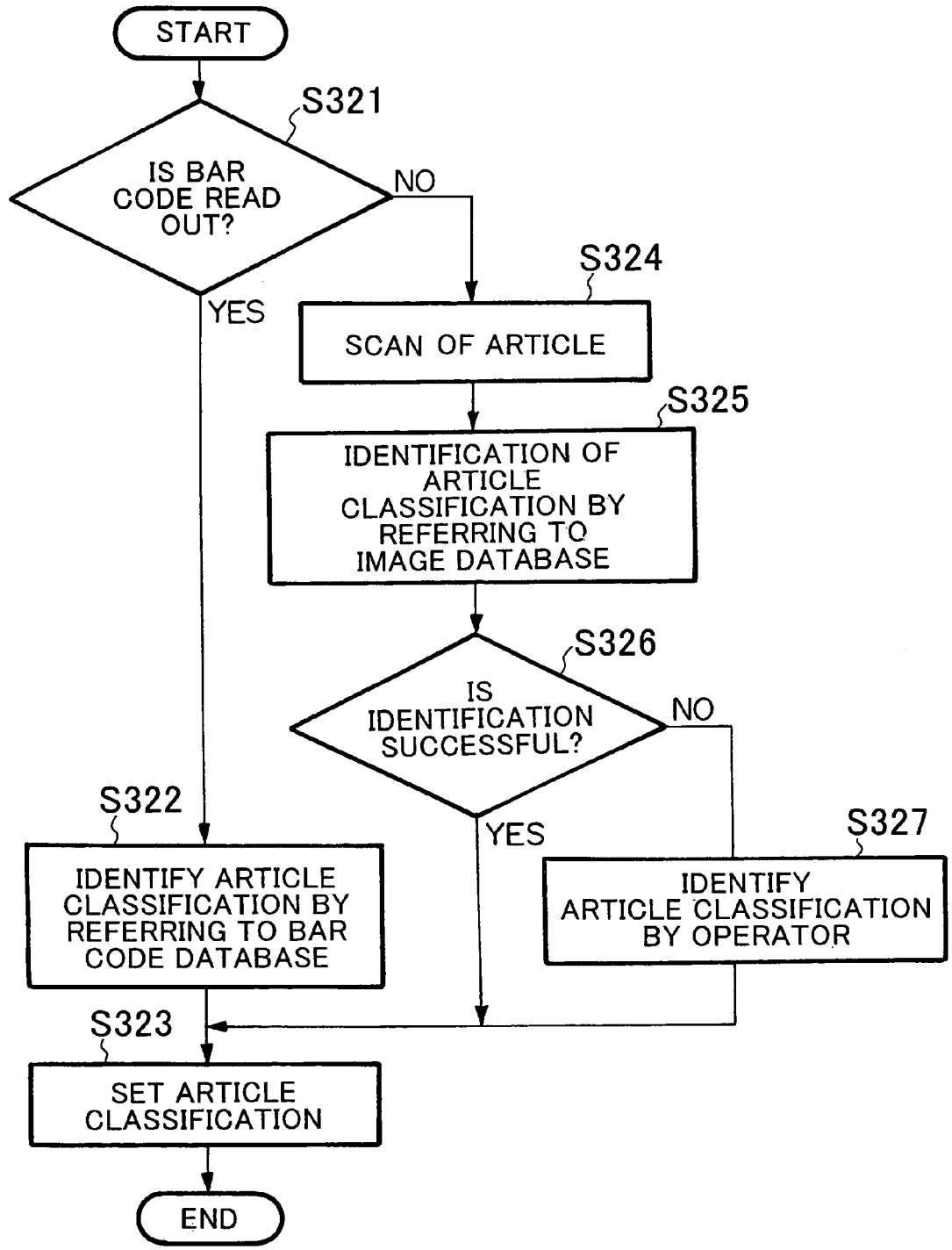
FIG. 5 is a flow chart showing article classification setting processing conducted by the ID reading and writing control server in the embodiment.

FIG. 5 specifically shows article classification setting processing conducted by the ID reading and writing control server 204 and represented by the step S301 in FIG. 4. At a stage in which an article 205 is placed on the RF tag reader/writer 207, the ID reading and writing control server 204 causes the bar code reader 211 to scan the bar code 208 of the article 205. If bar code information is read out (YES at step S321), the ID reading and writing control server 204 conducts retrieval in a bar code database which is connected to the network 202 and which is not illustrated and identifies the article classification (step S322). As for the retrieval in the bar code database, it is possible to conduct retrieval in data stored in a cache memory which is included in the ID reading and writing control server 204 and which is not illustrated and access the network 202 for retrieval when pertinent data is not present. As a matter of course, the bar code database may be provided in a storage medium which is included in the ID reading and writing control server 204 and which is not illustrated, or may be formed as a storage medium external to the ID reading and writing control server 204. If the article classification of the article 205 is identified, the classification is set as the subject of the ID (step 323).

On the other hand, if the article 205 has no bar codes, it is impossible to read out bar code information. In such a case (NO at the step S321), an image of the appearance of the article 205 is scanned using the image information input apparatus 213 shown in FIG. 1 (NO at step S324). The image recognition control unit 232 conducts retrieval in an image database disposed on the network 202 by using obtained image data and conducts processing of identifying the article classification (step S325). The image database may be disposed in advance in the ID reading and writing control server 204 in the same way as the bar code database, or may supplement suitably difference data from the database on the network 202.

If identification of the article classification is successful by reading the model number of the article 205 or on the basis of characters or marks of the manufacturing maker, the size of the article or the corrugated cardboard box, or the appearance including described characters or pictures (YES at step S326), the processing proceeds to the step S323 and the article classification of the article 205 is set. On the other hand, if the identification of the article classification has failed because there are two or more candidates or there are no candidates (NO at the step S326), article classification identification is conducted by the operator who is in the vicinity of the RF tag reader/writer 207 (step S327). In such a case, the operator inputs the article classification of the pertinent 205 by operating a keyboard and a mouse serving as a pointing device, which are not illustrated. If the article classification is specified by using the bar code reader 211 or the image input apparatus 213, the result may be displayed on a display which is included in the ID reading and writing control server 204 and which is not illustrated to urge the operator to confirm.

Figure 6:
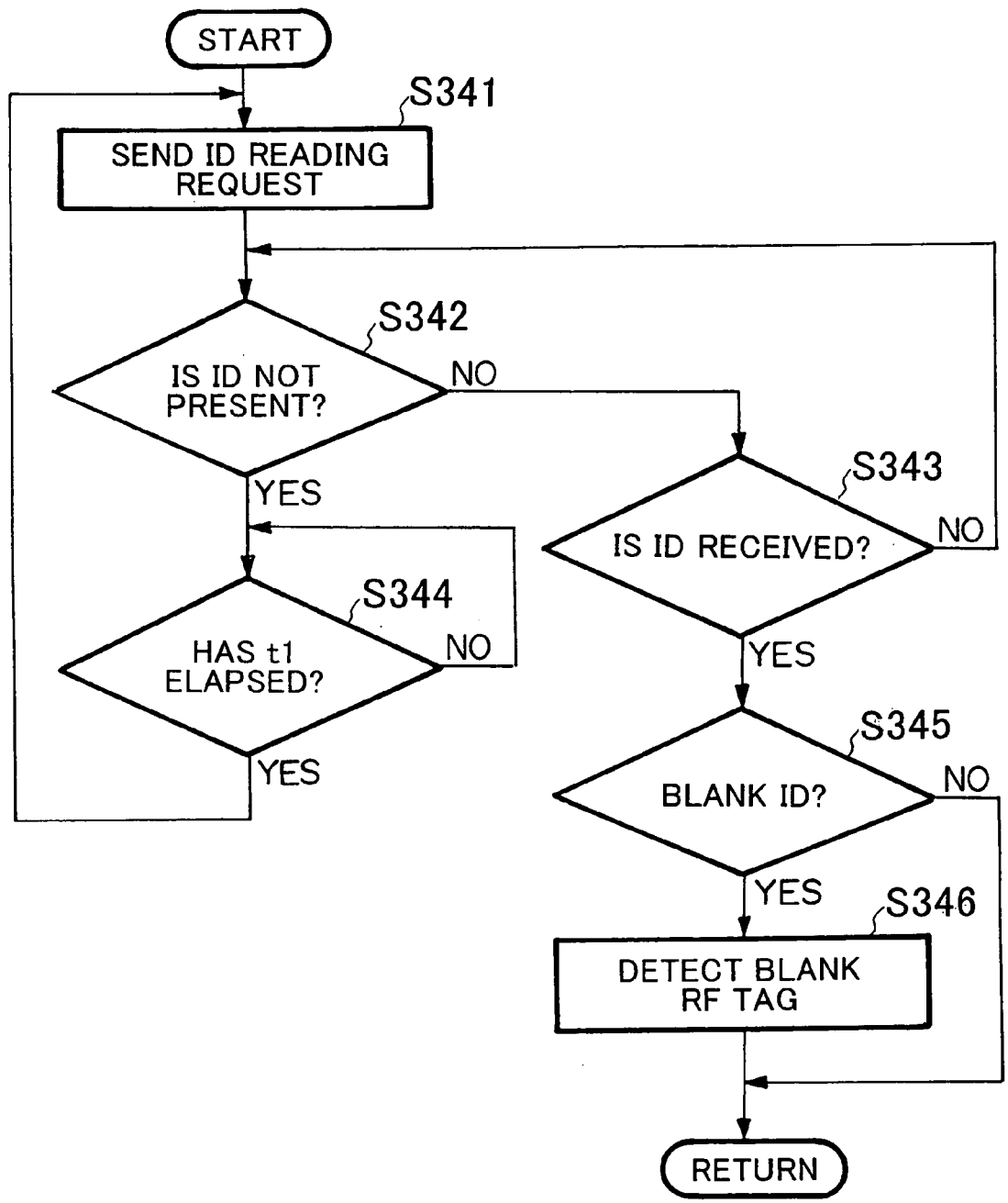
FIG. 6 is a flow chart showing processing conducted by the ID reading and writing control server in the embodiment until a blank RF tag is detected after article classification setting.

FIG. 6 specifically shows processing conducted by the ID reading and writing control server 204 until a blank RF tag is detected after the article classification is set, as the processing corresponding to the step S302. The ID reading unit 224 (FIG. 2) in the ID reading and writing control server 204 sends an ID reading request to the RF tag reader/writer 207 via the reader/writer control unit 221 (step S341). And the ID reading unit 224 waits until a signal indicating that the ID is not present is received (step S342) or an ID is received (step S343) from the RF tag reader writer 207.

If a signal indicating that the ID is not present is received (YES at the step S342), for example, the article 205 is not placed on the RF tag reader/writer 207. In such a case, the RF tag reader/writer 207 notifies that the ID is not present. After time t1 (YES at step S344), the ID reading and writing control server 204 sends the ID reading request to the RF tag reader/writer 207 again (step S341).

Figure 7:
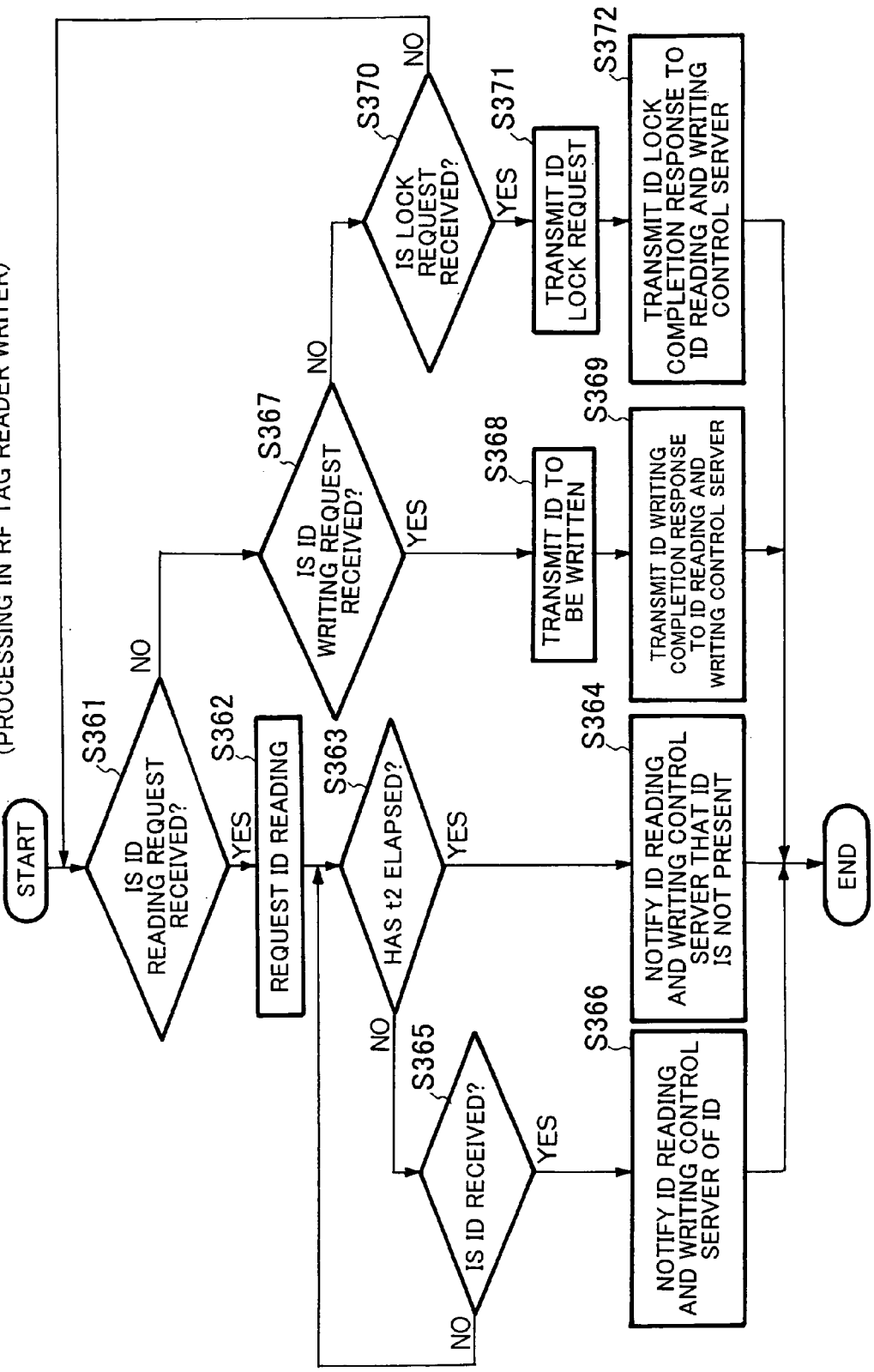
FIG. 7 is a flow chart showing processing conducted by an RF tag reader/writer in the embodiment.

FIG. 7 shows processing conducted by the RF tag reader/writer. Here, processing conducted by the RF tag reader/writer 207 will be described in the range of the processing shown in FIG. 6. Upon receiving an ID reading request from the ID reading and writing control server 204 (YES at step S361), the RF tag reader/writer 207 sends a radio wave to request the RF tag 206 to read an ID (step S362). If an ID is not received from the RF tag 206 within a time t2 predetermined as response time (YES at step S363), the ID reading and writing control server 204 is notified that the ID is not present (step S364).

On the other hand, if an ID is received from the RF tag 206 within a time t2 (NO at the step S363 and YES at step S365), the ID reading and writing control server 204 is notified of the received ID (step S366).

Referring back to FIG. 6, description of processing conducted in the ID reading and writing control server 204 will now be continued. If an article 205 having an RF tag 206 is placed on the RF tag reader/writer 207, the ID transmitted at the step S366 is received (YES at the step S343). The ID detection and check unit 225 in the ID reading and writing control server 204 shown in FIG. 2 checks whether the ID is a blank ID, i.e., whether the ID is an all "0" ID (step S345). If the ID is judged to be a blank ID (YES at the step S345), it is detected that the article has a blank RF tag (step S346). If the ID is judged not to be a blank ID (NO at the step S345), the article is an article having an ID already written therein and consequently it is not necessary to further conduct writing. In this case, therefore, ensuing writing processing is not conducted and the processing is finished.

Figure 8:
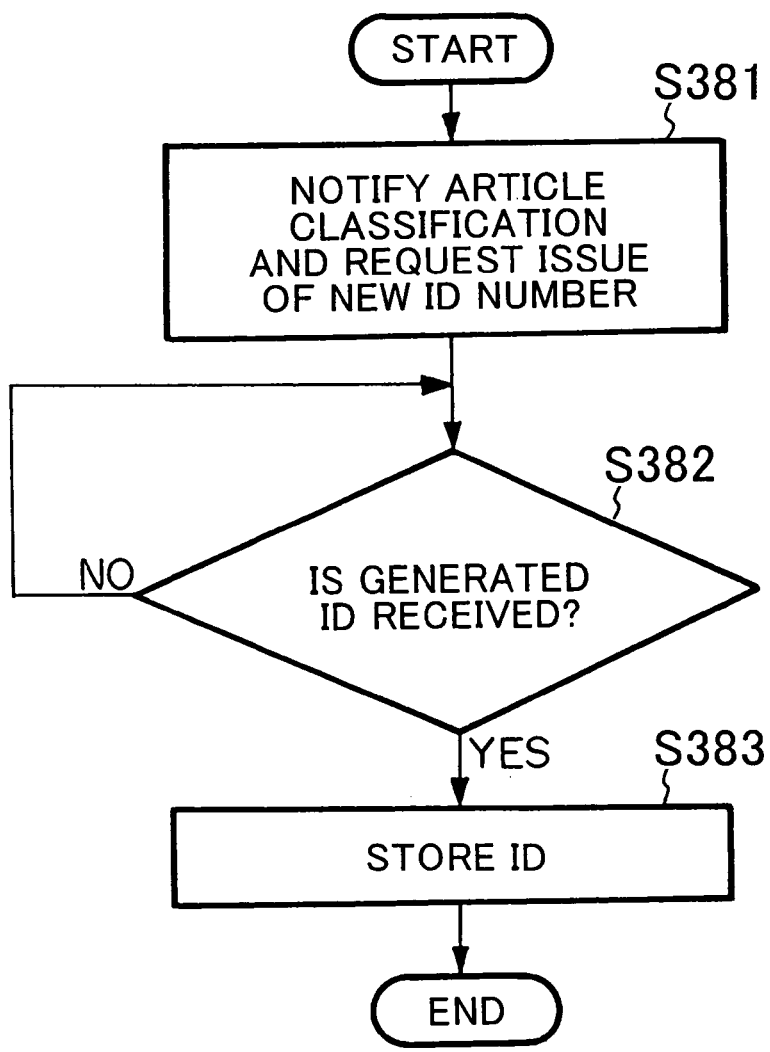
FIG. 8 is a flow chart showing new ID issue processing conducted by the ID reading and writing control server in the embodiment.

FIG. 8 specifically shows new ID issue processing conducted in the ID reading and writing control server as processing corresponding to the step S303. The ID reading and writing control server 204 requests the ID issue management server 203 to issue a new ID number by notifying the ID issue management server 203 of an identified article classification of the article 205 (step S381). And the ID reading and writing control server 204 waits for reception of a generated ID from the ID issue management server 203 (step S382).

Figure 9:
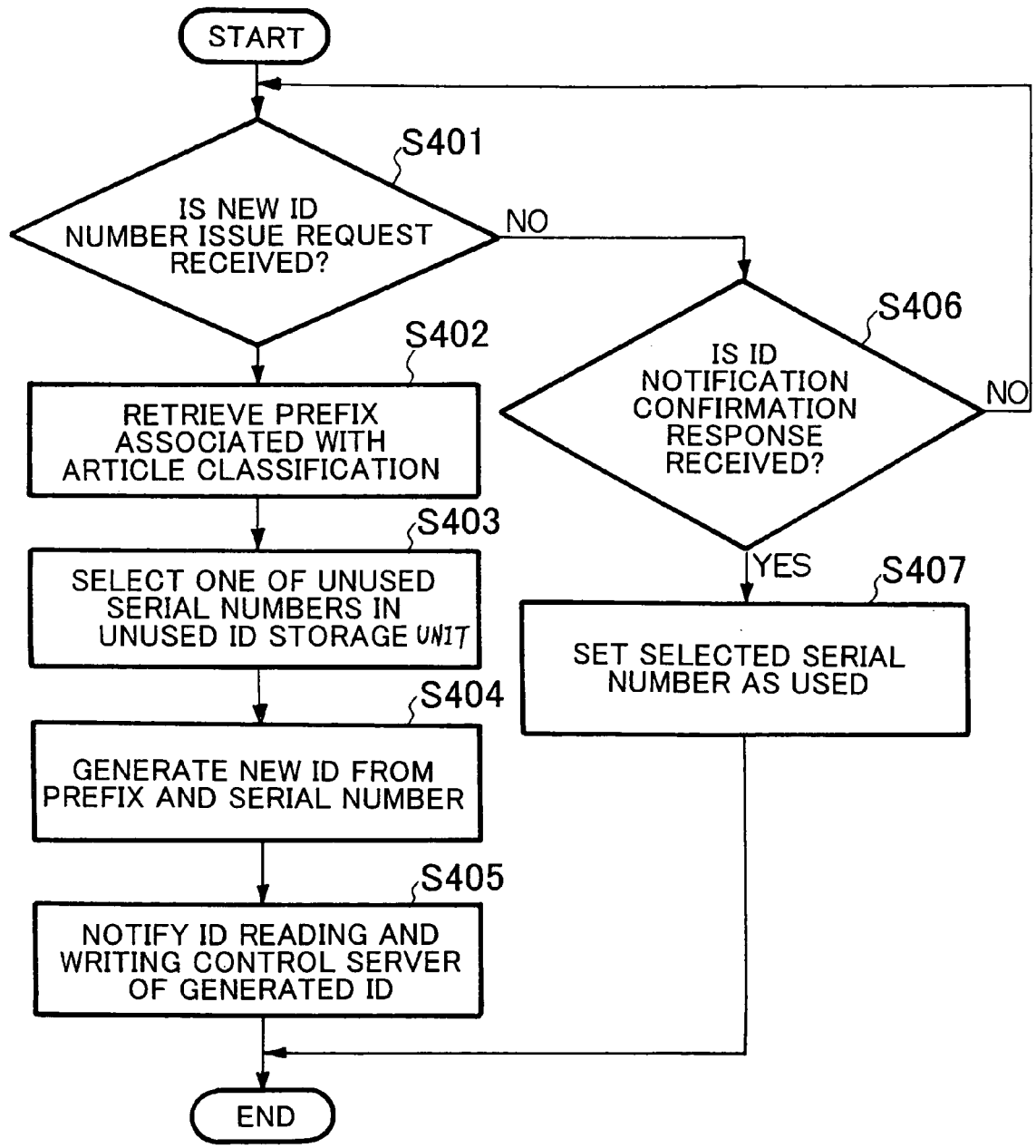
FIG. 9 is a flow chart showing new ID issue processing conducted by the ID issue management server in the embodiment.

FIG. 9 shows new ID issue processing conducted by the ID issue management server as processing corresponding to the step S303. Here, processing conducted by the ID issue management server 203 will be described in the range of the processing shown in FIG. 8. Upon receiving a new ID number issue request from the ID reading and writing control server 204 (YES at step S401), the ID issue management server 203 retrieves a prefix of an ID number associated with the article classification of the article 205 given as a notice (step S402). And the ID issue management server 203 selects one from unused serial numbers stored in the unused ID storage unit 242 (step S403), and generates a new ID number by using the prefix and the serial number (step S404). The generated new ID number is transmitted to the ID reading and writing control server 204 (step S405).

Referring back to FIG. 8, description will now be continued. Upon receiving the new ID number from the ID issue management server 203 (YES at step S382), the ID reading and writing control server 204 stores the new ID number in the ID temporary storage unit 228 shown in FIG. 2 (step S383). This is used when verification is conducted later.

Figure 10:
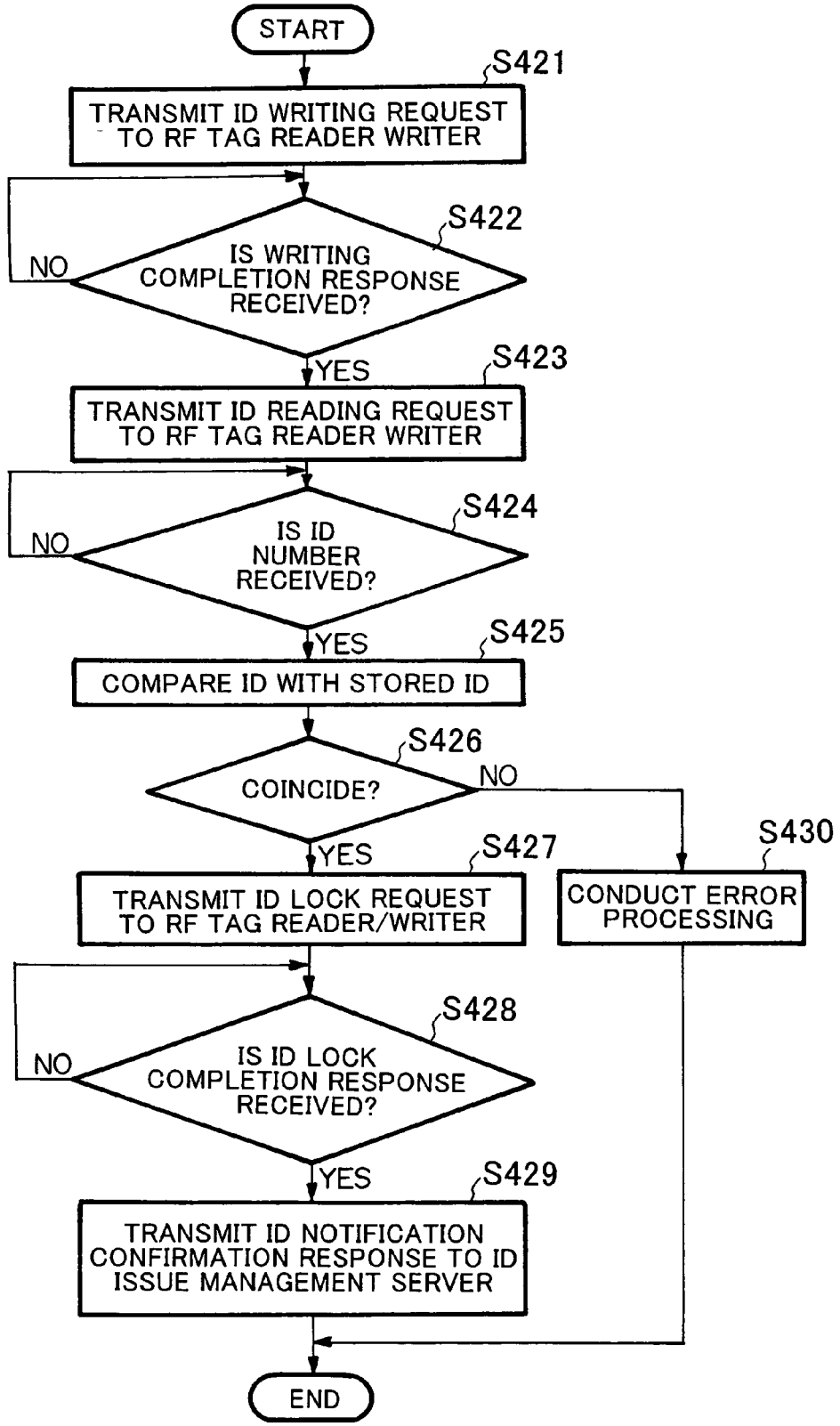
FIG. 10 is a flow chart showing processing subsequent to ID writing processing in the ID reading and writing control server in the embodiment.

FIG. 10 specifically shows processing subsequent to the step S304 in the ID reading and writing control server. First, the ID reading and writing control server 204 transmits an ID writing request to the RF tag reader/writer 207 (step S421). And the ID reading and writing control server 204 waits for reception of a writing completion response from the RF tag reader/writer 207 (step S422).

As shown in FIG. 7, upon receiving the ID writing request transmitted at the step S421 (YES at step S367), the RF tag reader/writer 207 transmits an ID to be written to the RF tag 206 by using a radio wave (step S368). On the basis of this, the RF tag 206 of the article 205 placed on the RF tag reader/writer 207 stores the transmitted ID. Upon transmitting the ID at the step S368, the RF tag reader/writer 207 transmits an ID writing completion response to the ID reading and writing control server 204 (step S369).

Referring back to FIG. 10 again, continuation of the processing conducted by the ID reading and writing control server 204 will now be described. Upon receiving the writing completion response from the RF tag reader/writer 207 (YES at step S422), the ID reading and writing control server 204 transmits an ID reading request to the RF tag reader/writer 207 this time (step S423). This is conducted because the writing completion response is sent from the RF tag reader/writer 207 without a response from the RF tag 206 and consequently it is necessary to verify whether an ID has been written correctly.

As already described with reference to FIG. 7, if this ID reading request is sent to the RF tag reader/writer 207 (YES at the step S361), the RF tag reader/writer 207 requests the RF tag 206 to read an ID (the step S362). Upon receiving an ID number (YES at the step S365), the RF tag reader/writer 207 notifies the ID reading and writing control server 204 thereof (the step S366).

Referring to FIG. 10, upon receiving the notification of the ID number (YES at step S424), the ID reading and writing control server 204 compares the ID number with the ID number stored in the ID temporary storage unit 228 at the step S383 (step S425). If they coincide with each other (YES at step S426), it is meant that the ID has been stored in the RF tag 206 correctly. Therefore, the ID reading and writing control server 204 transmits an ID lock request to the RF tag reader/writer 207 to fix the ID (step S427).

Referring back to FIG. 7, processing conducted by the RF tag reader/writer 207 will now be described. Upon receiving an ID lock request (YES at step S370), the RF tag reader/writer 207 transmits the ID lock request to the RF tag 206 by using a radio wave (step S371). Upon receiving this ID lock request, the RF tag 206 locks ID writing to prevent the written ID from being overwritten by another ID writing request. Upon transmitting the ID lock request, the RF tag reader/writer 207 transmits an ID lock completion response to the ID reading and writing control server 204 (step S372).

Referring back to FIG. 10 again, continuation of the processing conducted by the ID reading and writing control server 204 will now be described. Upon receiving the ID lock completion response from the RF tag reader/writer 207 (YES at step S428), the ID reading and writing control server 204 transmits an ID notification confirmation response to the ID issue management server 203 (step S429) to terminate the processing (end). If the ID read out from the RF tag 206 at the step S426 does not coincide with the new ID number (NO at the step S426), predetermined error processing is conducted (step S430).

The ID issue management server 203 receives the ID notification confirmation response transmitted from the ID reading and writing control server 204 at the step S429 (YES at step S406 shown in FIG. 9). And the ID issue management server 203 sets the unused serial number issued at the step S403 finally as the used serial number (step S407). As a matter of course, by temporarily regarding the serial number selected at the step S403 as an already used serial number before it is set as the already used serial number at the step S407, duplicate ID issue can be prevented.

As heretofore described, an ID depending upon the classification of the article 205 is written, and rewriting is prohibited when its verification is finished. A series of ID writing processing is thus finished. The operator repeats processing of placing an article on the RF tag reader/writer 207 and removing it. Thus, writing IDs into respective RF tags 206 proceeds.

(First Modification)

Figure 11:
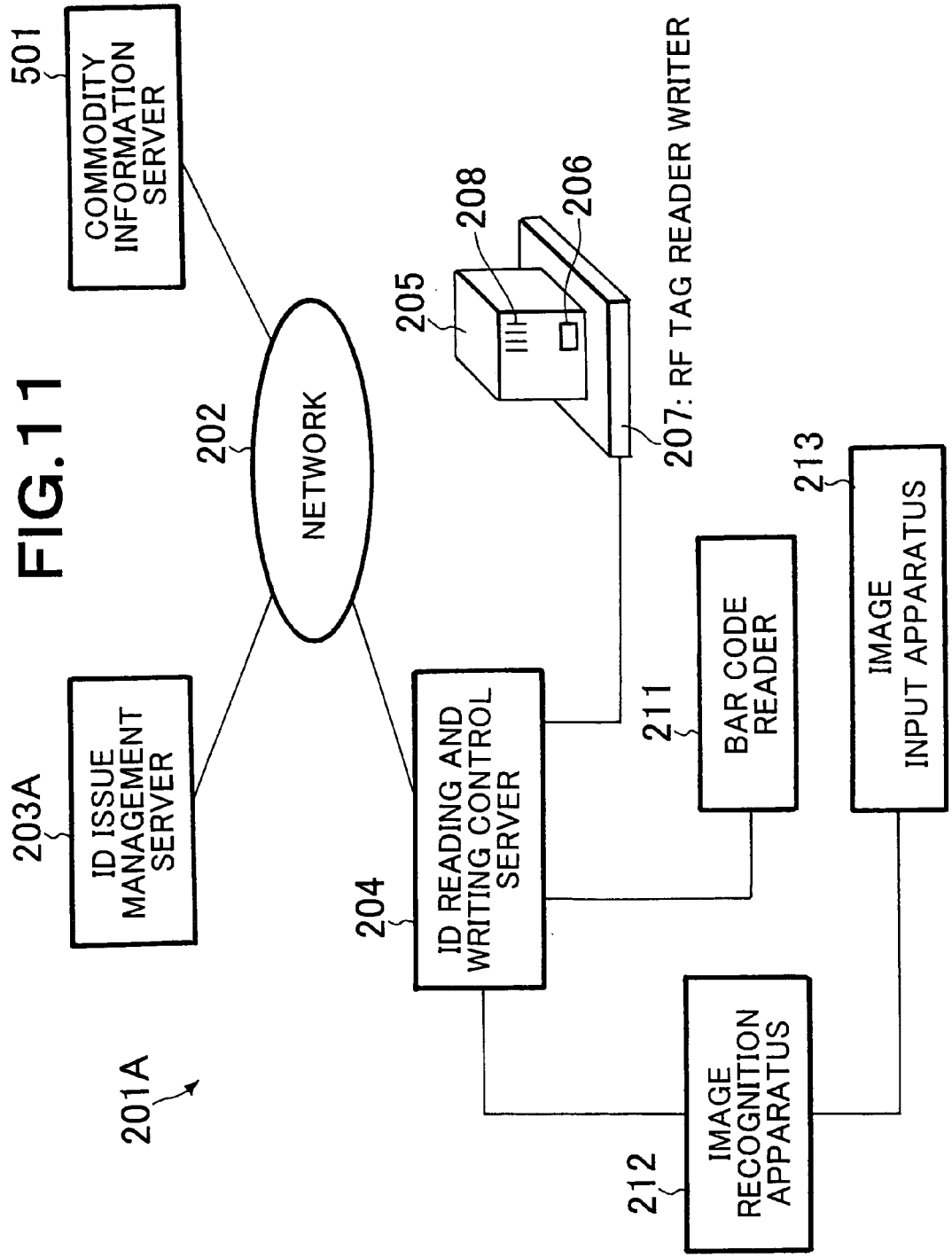
FIG. 11 is a system configuration diagram showing an outline of a configuration of an article information management system in a first modification of the present invention.

FIG. 11 shows an outline of a configuration of an article information management system according to a first modification of the present invention. In this article information management system 201A, a commodity information server 501 connected to the network 202 is added to the commodity information management system 201 shown in FIG. 1. The commodity information server 501 has a function of generating information concerning an article to which an RF tag 206 provided with an ID is attached, and altering, deleting and retrieving information.

Figure 12:
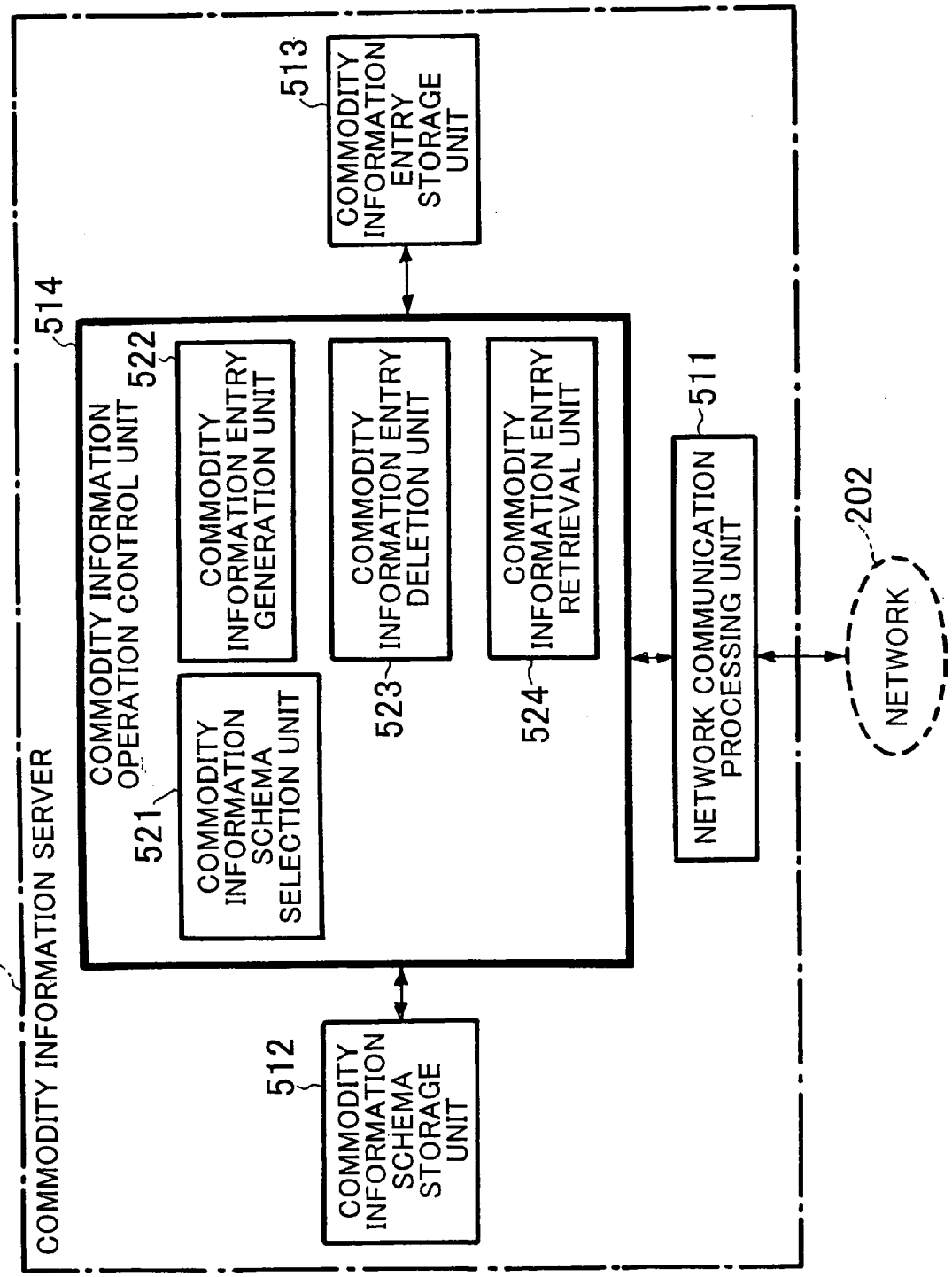
FIG. 12 is a block diagram showing an outline of a configuration of a commodity information server in the first modification.

FIG. 12 shows an outline of a configuration of the commodity information server. The commodity information server 501 includes a network communication processing unit 511 connected to the network 202. The commodity information server 501 is connected to a commodity information operation control unit 514 used to conduct various operations, together with a commodity information schema storage unit 512 which stores schemas which define the structure of a commodity information entry corresponding to a commodity classification, and a commodity information entry storage unit which stores a commodity information entry.

The commodity information operation control unit 514 includes a commodity information schema selection unit 521 which selects a commodity information schema from the commodity information schema storage unit 512, a commodity information entry generation unit 522 which generates a commodity information entry on the basis of the commodity information schema selected by the commodity information schema selection unit 521, a commodity information entry deletion unit 523 which deletes a commodity information entry, and a commodity information entry retrieval unit 524 which retrieves a commodity information entry.

The term "commodity information entry" used herein will now be described. The commodity information entry is a commodity information record associated with an individual article. The commodity information entry includes, for example, the following information.

(a) ID
(b) Commodity name
(c) Manufacturing maker name
(d) Date of manufacture
(e) Distribution history information Alteration of the commodity information entry is conducted in, for example, a distribution process of the article. For example, it is supposed that a certain article is delivered from a factory to a retail store via a distribution center. In the process of the commodity delivery, distribution history information is rewritten or added like the factory shipment date at the beginning, date of receipt at the distribution center, date of shipment from the distribution center, and date of receipt at the retail store. In this way, the commodity information entry is successively altered.

Deletion of the commodity information entry is conducted when distribution is conducted after elapse of a retention term determined in data concerning the commodity. For example, if a maker sets a limit to the term for dealing with enquiries from customers as to a used commodity that can have a market as a used article, the commodity information entry for the commodity in distribution after the elapse of the term is deleted. As another example, it is supposed that a certain trading company attempts to import a commodity A for sale, and there are stocks of only a set commodity in which the commodity A is contained in a commodity B having a receptacle which is a different commodity. The commodity B has an RF tag of the set commodity attached thereto. The trading company decides to import the set commodity, separate the commodity A, sell the commodity A singly, and sell the commodity B as well, as a new commodity. In this case, a commodity information entry is deleted as regards the commodity B of the receptacle.

Contents of the commodity information entry need not be the above-described data itself concerning the commodity, but they may be information (such as URL (Uniform Resource Locator)) of reference destination of data or a program. For example, as a commodity information entry of a refreshing drink, a URL of a program which calculates a price discount rate is indicated in some cases in addition to the entry contents mentioned as (a) to (e). In this case, the following service can be provided. When a customer settle accounts for an article at a register which is not illustrated at the time of article purchase, an associated program is called from a commodity information entry to calculate the discount rate by, for example, combining the ID with information such as the date of purchase and execute the discount.

Figure 13:
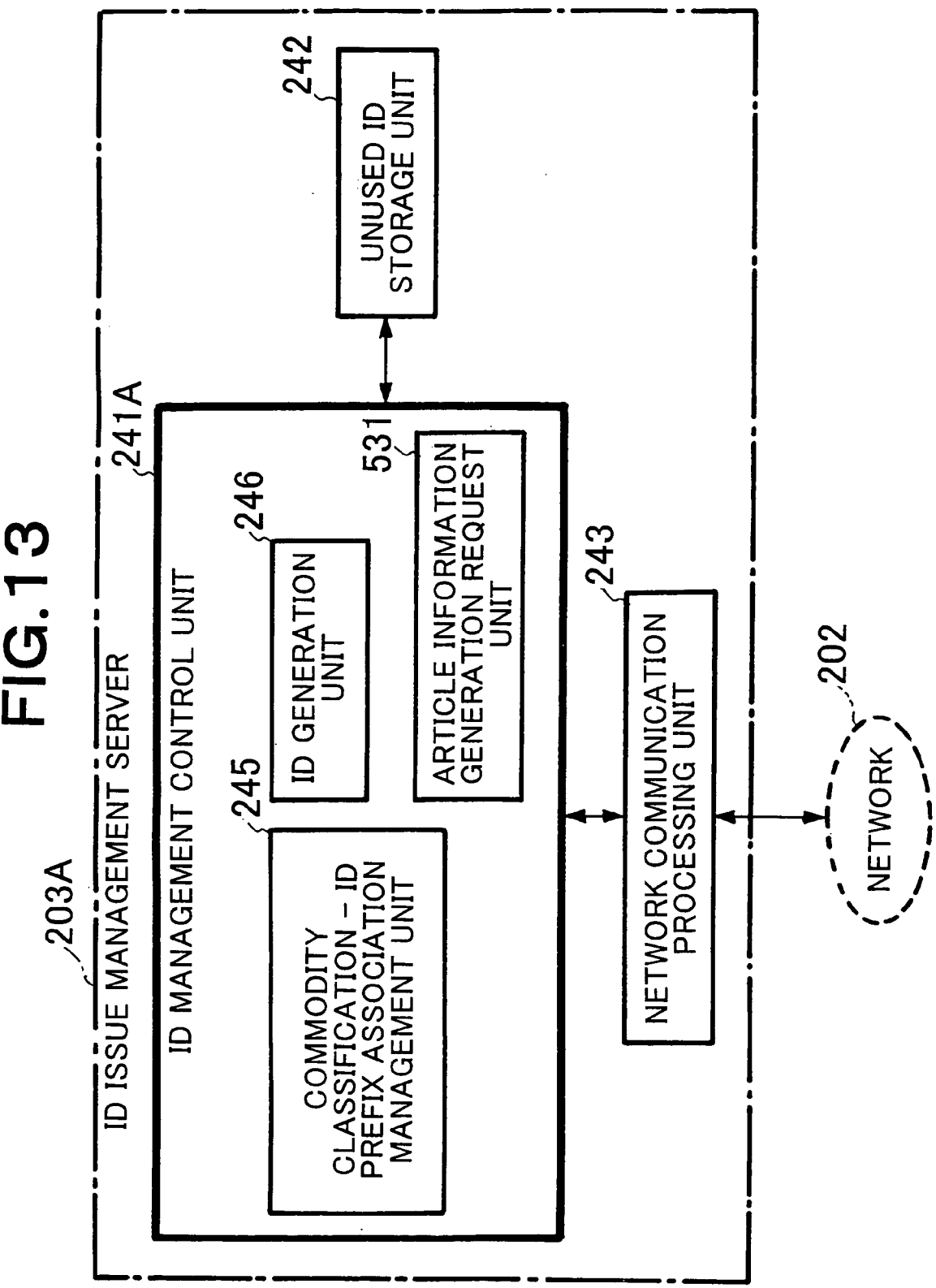
FIG. 13 is a block diagram showing a configuration of an ID issue management server in the first modification.

FIG. 13 shows a configuration of the ID issue management server in the first modification. In FIG. 13, the same components as those shown in FIG. 3 are denoted by same reference numerals and description of them will be omitted suitably. In an ID issue management server 203A in the first modification, an ID management control unit 241A which manages IDs includes an article information generation request unit 531 besides the commodity classification—ID prefix association management unit 245 and the ID generation unit 246 which generates a new ID. The article information generation request unit 531 requests to generate information of an article to which an RF tag 206 having a new ID written therein is attached.

In an article information management system 201 in the first modification, the relation between the ID issue management server 203A and the ID reading and writing control server 204, and relations among the ID reading and writing control server 204, the RF tag reader/writer 207, the bar code reader 211 and the image input apparatus 213 are completely the same as those in the embodiment. In other words, there is not any difference at all in the processing of newly providing an RF tag 206 attached to an article 206 with an ID. Therefore, control shown in FIGS. 5 to 8 is exercised in the article information management system 201A in the first modification as well without any alteration.

Figure 14:
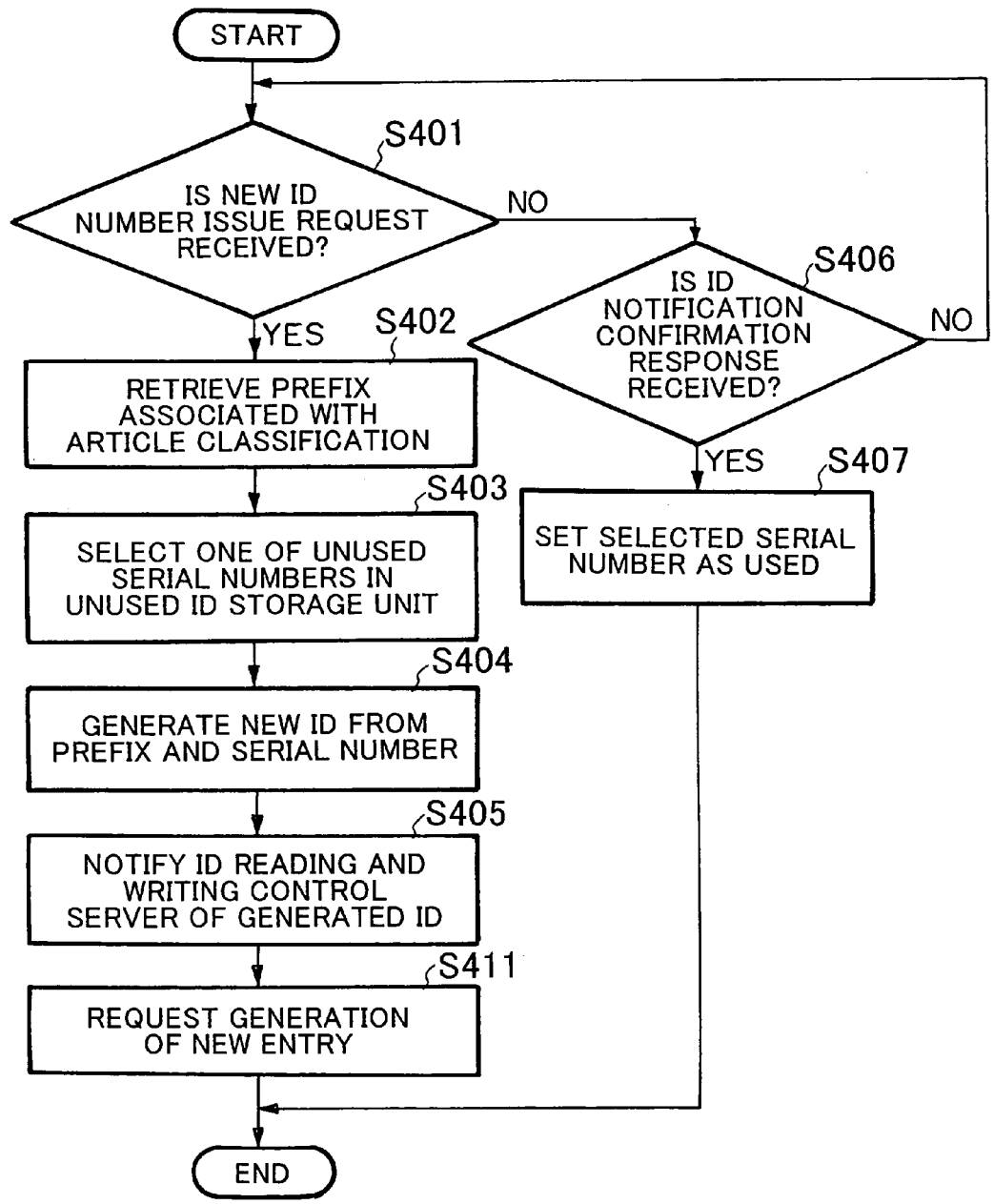
FIG. 14 is a flow chart showing new ID issue processing conducted by the ID issue management server in the first modification.

FIG. 14 shows new ID issue processing conducted by the ID issue management server, and it corresponds to FIG. 9 in the embodiment. Therefore, the same processing as that in FIG. 9 is denoted by a like step number, and description thereof will be omitted suitably. Upon generating the new ID number by using the prefix and the serial number at the step S404, the ID issue management server 203A transmits the generated new ID number to the ID reading and writing control server 204 (step S405). And the ID issue management server 203A requests the commodity information server 501 shown in FIG. 12 to generate a new entry for an article 205 concerning the new ID number (step S411).

Figure 15:
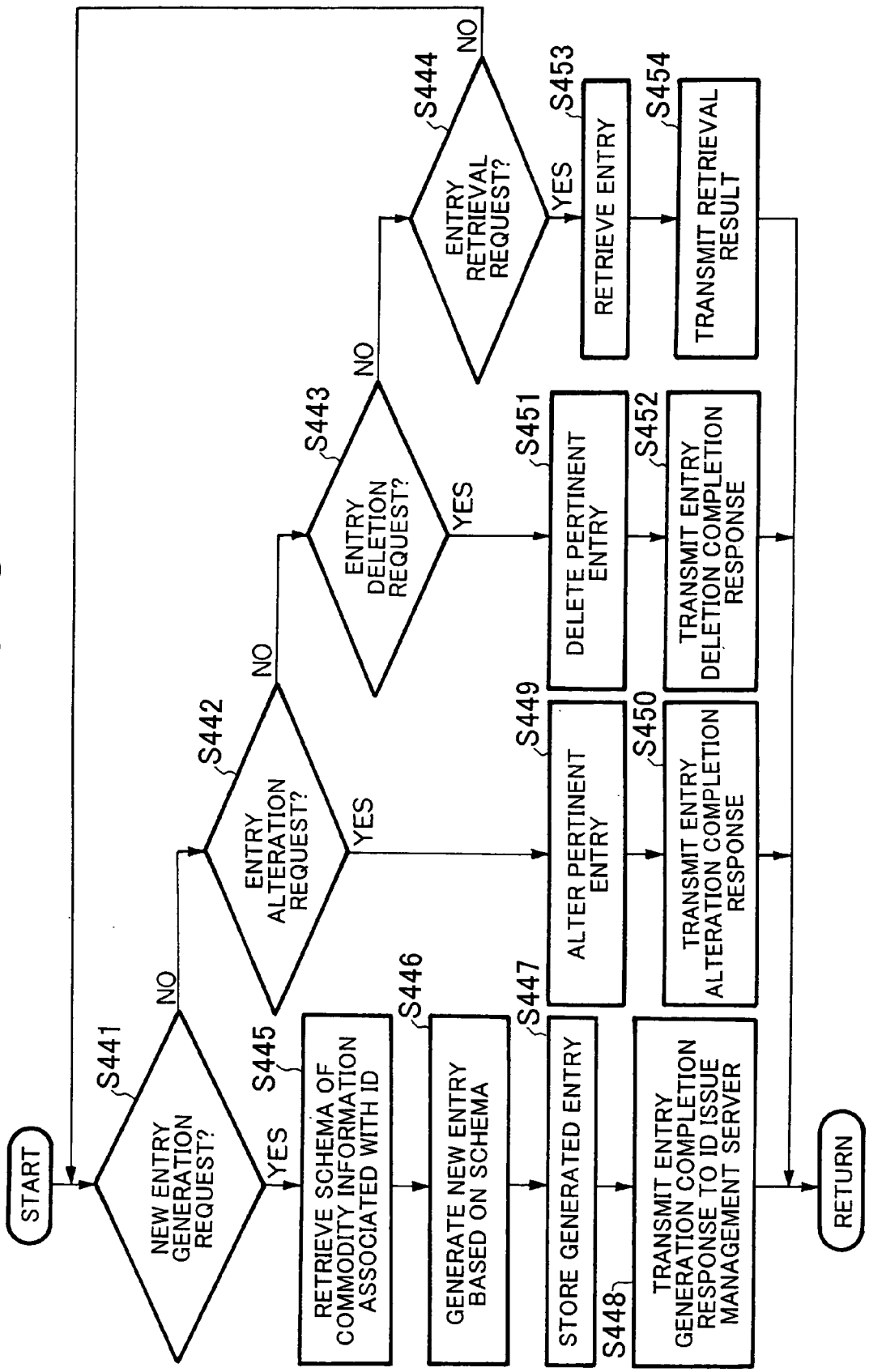
FIG. 15 is a flow diagram showing an outline of processing conducted by the commodity information server in the first modification.

FIG. 15 shows an outline of processing of the commodity information server in the first modification. The commodity information server 501 waits for the new entry generation request transmitted by the ID issue management server 203A at the step S411 in FIG. 14 (step S441), an entry alteration request (step S442), an entry deletion request (step S443), and an entry retrieval request (step S444).

Upon receiving the new entry generation request (YES at the step S441), the commodity information server 501 retrieves a commodity information schema associated with a generated ID from the commodity information schema storage unit 512 (FIG. 12) (step S445). And a new entry is generated on the basis of the schema (step S446). Since common information derived from the ID is described in the schema, information unique to the article 205, such as the ID, the date of ID issue, and the lot number, is added. As for information that the commodity information server 501 has not acquired when the generation of a new entry is requested, such as the lot number, the commodity information server 501 is connected to a production management system in a factory via a communication unit and necessary information is made accessible, acquisition being made possible.

If the requested new entry is generated, it is stored in the commodity information entry storage unit 513 (FIG. 12) (step S447). The commodity information server 501 transmits a signal to the ID issue management server 203A which has requested generation, to indicate that entry generation has been completed (step S448), and terminates the new entry generation processing (return).

On the other hand, if there is an alteration request for an already generated entry (YES at the step S442), the commodity information server 501 alters a pertinent place of the entry concerning the requested article 205 and transmits a response of entry alteration completion (step S450). If entry deletion is requested (YES at the step S443), the commodity information server 501 deletes the pertinent entry (step S451) and transmits a response of entry deletion completion (step S452). If there is an entry retrieval request (YES at the step S444), the commodity information server 501 conducts retrieval in the commodity information entry storage unit 513 (step S453) and transmits contents of the entry obtained as a result of the retrieval, to the request destination (step S454).

(Second Modification)

Figure 16:
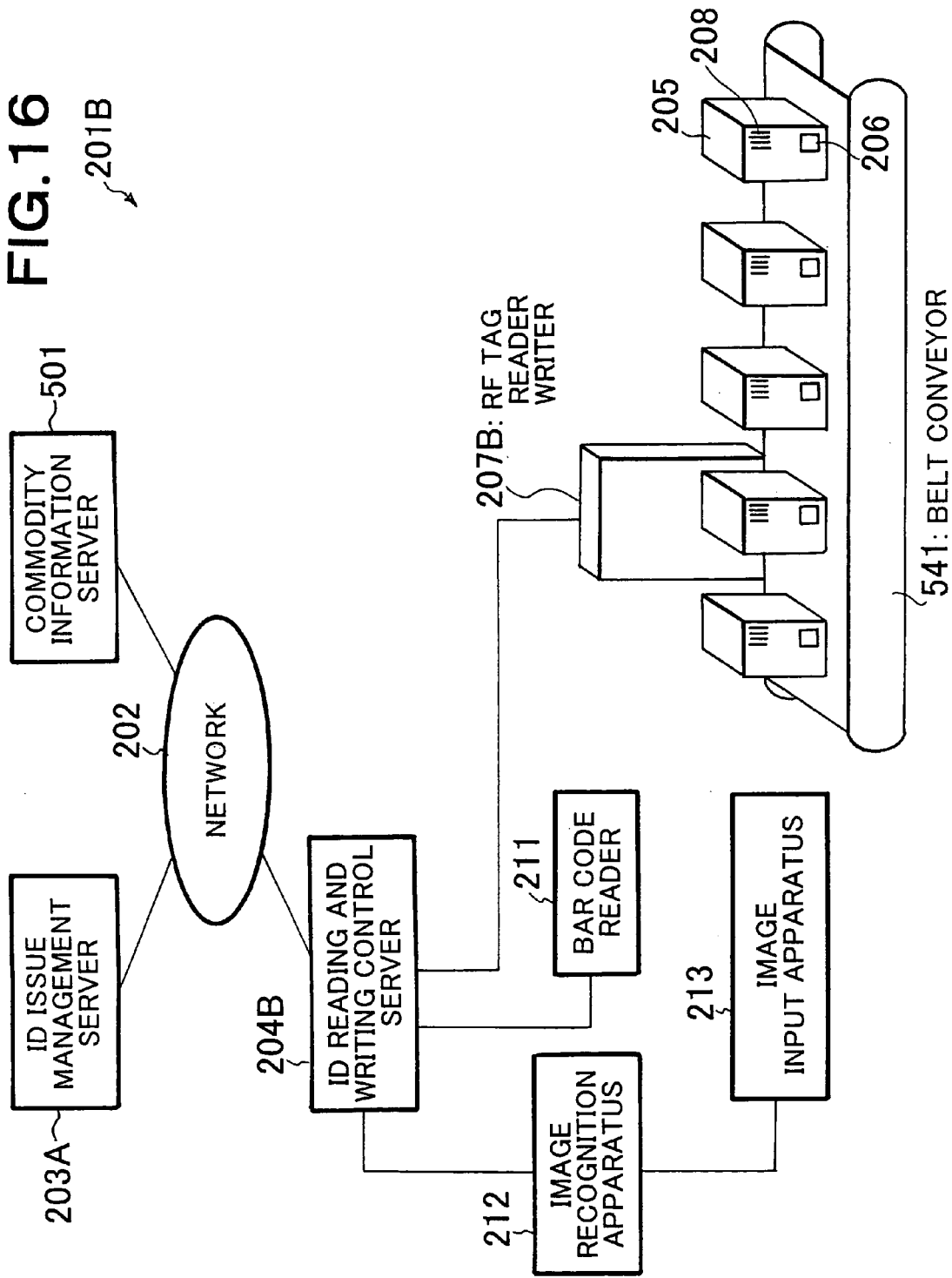
FIG. 16 is a schematic configuration diagram of an article information management system in a second modification of the present invention.

FIG. 16 shows an outline of a configuration of an article information management system according to a second modification of the present invention. In FIG. 16, the same components as those shown in FIG. 11 are denoted by same reference numerals and description of them will be omitted suitably. In an article information management system 201B in the second modification, a belt conveyor 541 is provided. An RF tag reader/writer 207B is disposed near a conveyance route to conduct reading and writing on an RF tag 206 attached to an article 205 conveyed by the belt conveyor 541. In the same way, a bar code reader 211 and an image information input apparatus 213 are disposed near the conveyance route. An ID reading and writing control server 204B is connected to the RF tag reader/writer 207B, the bar code reader 211, and an image recognition apparatus 212 which conducts image recognition on the article 205.

Thus, in the article information management system 201B in the second modification, ID writing is conducted while letting articles 205 on the belt conveyor 541. As a result, a large amount of article information can be managed per unit time. Since it is not necessary to set articles 205 on the RF tag reader/writer 207B one by one, the labor cost can be saved.

(Third Modification)

Figure 17:
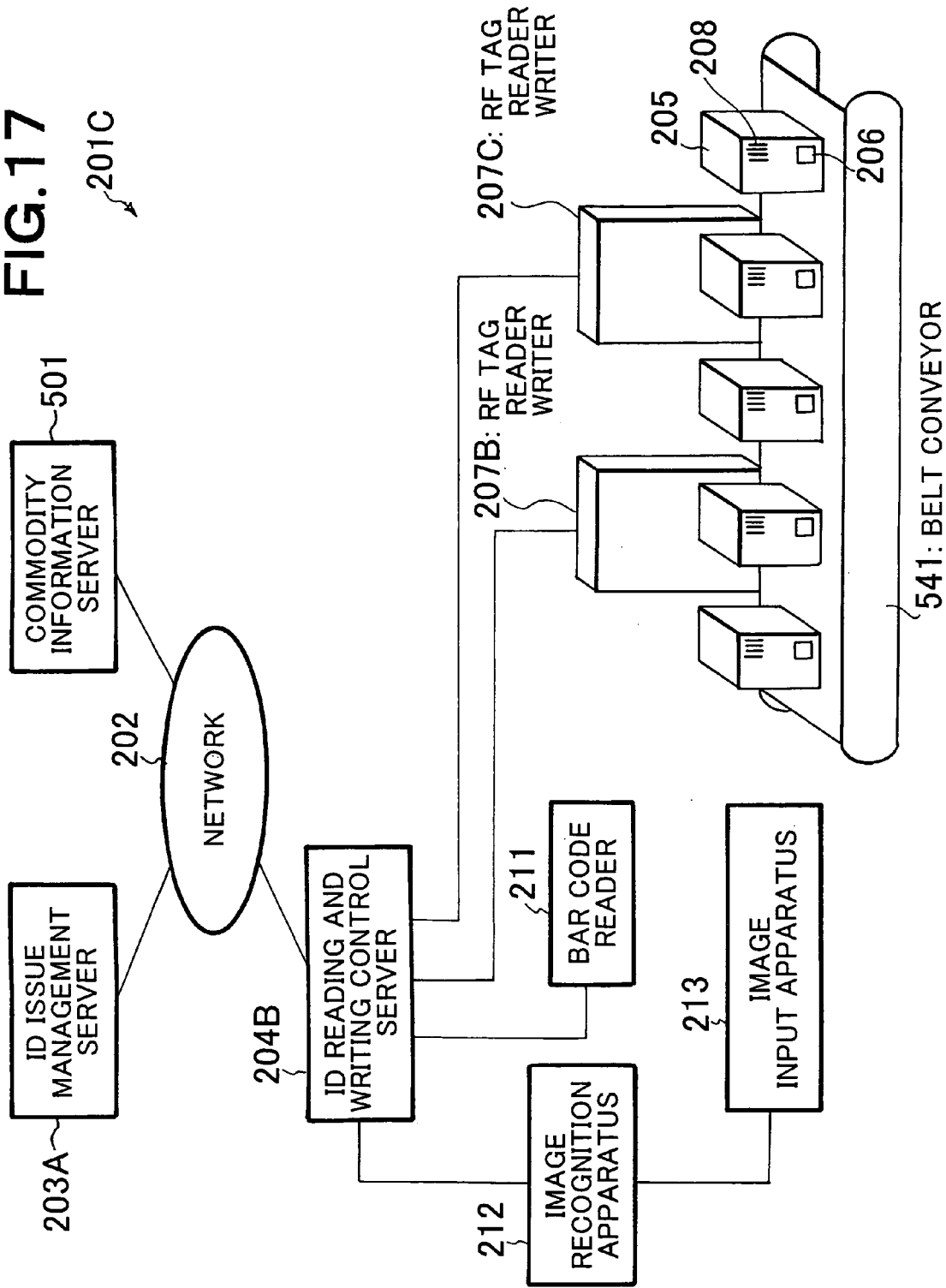
FIG. 17 is a schematic configuration diagram of an article information management system in a third modification of the present invention.

FIG. 17 shows an outline of a configuration of an article information management system according to a third modification of the present invention. In FIG. 17, the same components as those shown in FIG. 16 are denoted by same reference numerals and description of them will be omitted suitably. In an article information management system 201C in the third modification, two RF tag reader/writers 207B and 207C are disposed along a belt conveyor 541. The RF tag reader/writer 207B is disposed upstream and used to write an ID into an RF tag 206. The RF tag reader/writer 207C disposed downstream is used to verify the written ID. Therefore, the RF tag reader/writer 207C may be an apparatus dedicated to reading.

Unlike the article information management system 201B, it is not necessary to conduct ID writing and verification of the written ID by using one RF tag reader/writer 207B in the article information management system 201C in the third modification. Therefore, the speed of the articles 205 flowing on the belt conveyor 541 can be increased and the amount of processing per unit time can be increased. Furthermore, by providing the RF tag reader/writer 207C for verification, detecting a failure in ID writing and reading, and writing the ID again, reliability in article information management can be improved even when the radio environment is poor.

In the embodiment and modifications heretofore described, the RF tag is attached to an article or a commodity. Like bar codes, however, the RF tag itself may be printed on the article or the commodity.

In the embodiment and modifications, the bar code reader and the image recognition apparatus are included in the article information management system. However, they may be omitted suitably. It is also free to add another input device in order to distinguish an article or commodity.

What is claimed is:

1. An ID issue management system comprising:
article classification setting means which set an article classification serving as unit of handling, for a subject article;
ID issue means which select one unused number from among numbers assigned in advance to the article classification set by the article classification setting means, and issue a new ID having a combination of the selected number with the article classification;
tag discrimination means which determine every subject article of ID issue whether a tag having an already issued ID stored therein is attached or a tag having a blank ID is attached; and
ID writing means which write an ID issued by the ID issue means into a tag when the tag is judged by the tag discrimination means to have a blank ID;
wherein the article classification setting means comprise:
a bar code reader which reads a bar code attached to an article; and
article classification discrimination means which discriminate an article classification on the basis of bar code information read by the bar code reader, an article classification being set on the basis of a result of discrimination conducted by the article classification discrimination means.

2. The ID issue management system according to claim 1, further comprising:
ID comparison means which read out an ID written by the ID writing means, and compare the ID with an ID issued by the ID issue means to an article to which a tag storing the ID read out is attached;
verification means which verify whether ID coincidence is detected in the ID comparison means; and
lock means which lock the ID written by the ID writing means so as not to be rewritten illegally, when the verification means detect ID coincidence and verify that the ID is written correctly.

3. An article information management system comprising:
the ID issue management system according to claim 1; and
a management server which registers information of an article to which a tag having an ID stored therein is attached, in association with the ID, when the ID issue means have issued the ID, and manages information of the article.

4. An ID issue management system comprising:
article classification setting means which set an article classification serving as unit of handling, for a subject article;
ID issue means which select one unused number from among numbers assigned in advance to the article classification set by the article classification setting means, and issue a new ID having a combination of the selected number with the article classification;
tag discrimination means which determine every subject article of ID issue whether a tag having an already issued ID stored therein is attached or a tag having a blank ID is attached; and
ID writing means which write an ID issued by the ID issue means into a tag when the tag is judged by the tag discrimination means to have a blank ID;
wherein the article classification setting means comprise:
image scan means which scan an image of appearance of an article; and
article classification discrimination means which discriminate an article classification on the basis of image data obtained by the image scan means, an article classification being set on the basis of a result of discrimination conducted by the article classification discrimination means.

5. The ID issue management system according to claim 4, further comprising:
ID comparison means which read out an ID written by the ID writing means, and compare the ID with an ID issued by the ID issue means to an article to which a tag storing the ID read out is attached;
verification means which verify whether ID coincidence is detected in the ID comparison means; and
lock means which lock the ID written by the ID writing means so as not to be rewritten illegally, when the verification means detect ID coincidence and verify that the ID is written correctly.

6. An article information management system comprising:
the ID issue management system according to claim 4; and
a management server which registers information of an article to which a tag having an ID stored therein is attached, in association with the ID, when the ID issue means have issued the ID, and manages information of the article.

7. An ID issue management method comprising:
an article classification setting step of setting an article classification serving as unit of handling, for a subject article;
an ID issue step of selecting one unused number from among numbers assigned in advance to the article classification set at the article classification setting step, and issuing a new ID having a combination of the selected number with the article classification;
a tag discrimination step of determining every subject article of ID issue whether a tag having an already issued ID stored therein is attached or a tag having a blank ID is attached; and
an ID writing step of writing an ID issued at the ID issue step into a tag when the tag is judged at the tag discrimination step to have a blank ID,
wherein the article classification setting step comprises:
a reading step of reading a bar code reader attached to an article; and
a discriminating step of discriminating an article classification on the basis of bar code information read by the reading step, an article classification being set on the basis of a result of discrimination conducted by the discriminating step.

8. The ID issue management method according to claim 7, further comprising:
an ID comparison step of reading out an ID written at the ID writing step, and comparing the ID with an ID issued at the ID issue step to an article to which a tag storing the ID read out is attached;
a verification step of verifying whether ID coincidence is detected at the ID comparison step; and
a lock step of locking the ID written at the ID writing step so as not to be rewritten illegally, when ID coincidence is detected and it is verified that the ID is written correctly at the verification step.

9. An ID issue management method comprising:
an article classification setting step of setting an article classification serving as unit of handling, for a subject article;
an ID issue step of selecting one unused number from among numbers assigned in advance to the article classification set at the article classification setting step, and issuing a new ID having a combination of the selected number with the article classification;

a tag discrimination step of determining every subject article of ID issue whether a tag having an already issued ID stored therein is attached or a tag having a blank ID is attached; and an ID writing step of writing an ID issued at the ID issue step into a tag when the tag is judged at the tag discrimination step to have a blank ID, wherein the article classification setting step comprises:

an image scan step of scanning an image of appearance of an article; and an article classification discrimination step of discriminating an article classification on the basis of image data obtained by the image scan step, an article classification being set on the basis of a result of discrimination conducted by the article classification discrimination step.

10. The ID issue management method according to claim 9, further comprising:

an ID comparison step of reading out an ID written at the ID writing step, and comparing the ID with an ID issued at the ID issue step to an article to which a tag storing the ID read out is attached;

a verification step of verifying whether ID coincidence is detected at the ID comparison step; and a lock step of locking the ID written at the ID writing step so as not to be rewritten illegally, when ID coincidence is detected and it is verified that the ID is written correctly at the verification step.

11. An ID issue management system comprising:

an article classification setting unit which is configured to set an article classification serving as unit of handling, for a subject article;

an ID issue unit which is configured to select one unused number from among numbers assigned in advance to the article classification set by the article classification setting unit, and issue a new ID having a combination of the selected number with the article classification;

a tag discrimination unit which is configured to determine every subject article of ID issue whether a tag having an already issued ID stored therein is attached or a tag having a blank ID is attached; and an ID writing unit which is configured to write an ID issued by the ID issue unit into a tag when the tag is judged by the tag discrimination unit to have a blank ID;

wherein the article classification setting unit comprises:

a bar code reader which is configured to read a bar code attached to an article; and an article classification discrimination unit which is configured to discriminate an article classification on the basis of bar code information read by the bar code reader, an article classification being set on the basis of a result of discrimination conducted by the article classification discrimination unit.

12. An ID issue management system comprising:

an article classification setting unit which is configured to set an article classification serving as unit of handling, for a subject article;

an ID issue unit which is configured to select one unused number from among numbers assigned in advance to the article classification set by the article classification setting unit, and issue a new ID having a combination of the selected number with the article classification;

a tag discrimination unit which is configured to determine every subject article of ID issue whether a tag having an already issued ID stored therein is attached or a tag having a blank ID is attached; and an ID writing unit which is configured to write an ID issued by the ID issue unit into a tag when the tag is judged by the tag discrimination unit to have a blank ID;

wherein the article classification setting unit comprises:

an image scan unit which is configured to scan an image of appearance of an article; and an article classification discrimination unit which is configured to discriminate an article classification on the basis of image data obtained by the image scan unit, an article classification being set on the basis of a result of discrimination conducted by the article classification discrimination unit.

* * * * *